(12) United States Patent
Wang et al.

(10) Patent No.: US 10,837,802 B2
(45) Date of Patent: Nov. 17, 2020

(54) POSITION SENSING SYSTEM WITH AN ELECTROMAGNET

(71) Applicant: Regents of the University of Minnesota, Minneapolis, MN (US)

(72) Inventors: Heng Wang, Minneapolis, MN (US); Rajesh Rajamani, Saint Paul, MN (US); Ryan Madson, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 16/105,660

(22) Filed: Aug. 20, 2018

(65) Prior Publication Data

US 2019/0011289 A1 Jan. 10, 2019

Related U.S. Application Data

(63) Continuation-in-part of application No. 15/657,407, filed on Jul. 24, 2017.

(Continued)

(51) Int. Cl.
*G01D 5/20* (2006.01)
*G01D 5/14* (2006.01)
(Continued)

(52) U.S. Cl.
CPC .......... *G01D 5/2013* (2013.01); *G01D 5/147* (2013.01); *G01V 3/081* (2013.01); *G01V 3/12* (2013.01)

(58) Field of Classification Search
CPC .......... G01B 7/003; G01B 7/30; G01D 5/147; G01D 5/2013; G01D 5/145; G01V 3/12; G01V 3/10
(Continued)

(56) References Cited

U.S. PATENT DOCUMENTS 3,199,630 A * 8/1965 Hartel .................. G01D 13/26
                                                                187/394
3,671,814 A * 6/1972 Dick .......................... G05F 7/00
                                                                361/154
(Continued)

FOREIGN PATENT DOCUMENTS

CA          1208366 A        7/1986
CN        101080610 A      11/2007
(Continued)

OTHER PUBLICATIONS

Girard, A., Bigue, J.P.L., O'Brien, B.M., Gisby, T.A., Anderson, I.A. and Plante, J.S., 2014. Soft two-degree-of-freedom dielectric elastomer position sensor exhibiting linear behavior. IEEE/ASME Transactions on Mechatronics, 20(1), pp. 105-114. (Year: 2014).*

(Continued)

*Primary Examiner* — Christopher P McAndrew
(74) *Attorney, Agent, or Firm* — Dicke, Billig & Czaja, PLLC

(57) ABSTRACT

A position sensing system for measuring a position of a linearly moving object includes a high magnetic permeability material positioned on the moving object, an electromagnet configured to generate an alternating magnetic field, and at least one magnetic sensor configured to measure an intensity of a first magnetic field that is based on the alternating magnetic field. A controller is configured to estimate a linear position of the moving object based on the measured intensity of the first magnetic field.

19 Claims, 22 Drawing Sheets

Related U.S. Application Data

(60) Provisional application No. 62/365,829, filed on Jul. 22, 2016.

(51) Int. Cl.
  *G01V 3/12* (2006.01)
  *G01V 3/08* (2006.01)

(58) Field of Classification Search
  USPC .................................................... 324/27.15
  See application file for complete search history.

(56) References Cited

U.S. PATENT DOCUMENTS

| | | | |
|---|---|---|---|
| 4,401,946 A * | 8/1983 | Klimstra | F02P 7/067 324/166 |
| 4,401,986 A * | 8/1983 | Trenkler | G01D 5/204 324/207.15 |
| 4,422,041 A * | 12/1983 | Lienau | G01B 7/003 324/174 |
| 4,560,930 A | 12/1985 | Kouno | |
| 4,626,781 A | 12/1986 | Forkel | |
| 4,638,250 A * | 1/1987 | Shen-Orr | G01D 5/206 324/207.14 |
| 4,652,820 A * | 3/1987 | Maresca | G01B 7/02 324/207.16 |
| 4,806,859 A | 2/1989 | Hetrick | |
| 4,810,965 A | 3/1989 | Fujiwara et al. | |
| 4,992,733 A * | 2/1991 | Griebeler | F15B 15/2846 324/207.21 |
| 5,097,183 A | 3/1992 | Vila-Masot et al. | |
| 5,216,364 A * | 6/1993 | Ko | B60G 17/01933 324/207.17 |
| 5,315,244 A * | 5/1994 | Griebeler | F15B 15/2846 324/207.13 |
| 5,440,183 A * | 8/1995 | Denne | F15B 15/00 310/12.26 |
| 5,589,769 A | 12/1996 | Krahn | |
| 5,621,317 A * | 4/1997 | Wozniak | F16H 59/105 324/207.13 |
| 6,043,644 A * | 3/2000 | de Coulon | G01D 5/2208 324/164 |
| 6,160,395 A | 12/2000 | Goetz | |
| 6,367,565 B1 | 4/2002 | Hall | |
| 6,424,896 B1 | 7/2002 | Lin et al. | |
| 6,462,439 B1 * | 10/2002 | Denne | H02K 41/031 310/17 |
| 6,469,500 B1 * | 10/2002 | Schmitz | B60G 17/01933 123/90.11 |
| 6,642,710 B2 * | 11/2003 | Morrison | G01B 7/003 324/207.12 |
| 6,836,032 B2 * | 12/2004 | Vaknin | H02K 41/03 310/12.24 |
| 6,894,485 B2 * | 5/2005 | Green | B60T 13/569 324/207.2 |
| 6,922,158 B2 * | 7/2005 | Ymker | F15B 15/2846 341/15 |
| 7,116,097 B2 * | 10/2006 | Revankar | F15B 15/2846 324/207.13 |
| 7,173,414 B2 | 2/2007 | Ricks et al. | |
| 7,816,911 B2 * | 10/2010 | Taylor | G01D 3/036 324/207.15 |
| 8,476,896 B2 | 7/2013 | Mednikov | |
| 9,360,345 B2 | 6/2016 | Fox | |
| 10,260,904 B2 | 4/2019 | Rajamani et al. | |
| 10,436,604 B2 | 10/2019 | Rajamani et al. | |
| 2004/0017186 A1 | 1/2004 | Viola | |
| 2005/0285591 A1 * | 12/2005 | Higgins | G01B 7/004 324/207.17 |
| 2008/0116882 A1 * | 5/2008 | Taylor | G01D 3/036 324/207.15 |
| 2010/0045275 A1 | 2/2010 | Frachon | |
| 2013/0138264 A1 | 5/2013 | Hoshizaki | |
| 2013/0341934 A1 | 12/2013 | Kawanishi | |
| 2014/0091196 A1 | 4/2014 | Maas et al. | |
| 2015/0187615 A1 * | 7/2015 | Daugherty | C23C 24/04 438/710 |
| 2015/0189797 A1 * | 7/2015 | Oster | H01L 23/552 361/679.55 |
| 2015/0377648 A1 | 12/2015 | Sirohiwala et al. | |
| 2016/0041235 A1 * | 2/2016 | Ausserlechner | G01D 5/145 324/244 |
| 2016/0043304 A1 * | 2/2016 | Chen | H01L 43/08 257/421 |
| 2016/0054149 A1 | 2/2016 | Alvarado | |
| 2016/0123771 A1 * | 5/2016 | David | G01D 5/147 324/207.2 |
| 2018/0138842 A1 * | 5/2018 | Sun | H02P 6/26 |

FOREIGN PATENT DOCUMENTS

| | | |
|---|---|---|
| EP | 0215454 A1 | 3/1987 |
| EP | 0215454 B1 | 1/1990 |
| EP | 0404534 A1 | 12/1990 |
| EP | 1818651 A1 | 8/2007 |
| FR | 2800459 A1 | 5/2001 |
| FR | 2830614 A1 | 4/2003 |
| FR | 2909170 A1 | 5/2008 |
| JP | 2000088506 A | 3/2000 |
| JP | 2009222518 A | 10/2009 |
| JP | 2010030406 A | 2/2010 |
| WO | 2005047823 A1 | 5/2005 |
| WO | 2014153422 A1 | 9/2014 |

OTHER PUBLICATIONS

Girard, A., Bigue, J.P.L., O'Brien, B.M., Gisby, T.A., Anderson, I .A. and Plante, J.S., 2014. Soft two-degree-of-freedom dielectric elastomer position sensor exhibiting linear behavior. IEEE/ASME Transactions on Mechatronics, 20(1), pp. 105-114. (Year: 2014) (Year: 2014).*

International Search Report and Written Opinion re PCT/US2014/031250, dated Aug. 4, 2014 (10 pages).

"Nature-Inspired Position Determination Using Inherent Magnetic Fields" by Saber Taghvaeeyan & Rajesh Rajamani, published in Technology, vol. 2, No. 2, Jun. 2014 by World Scientific Publishing Co./mperial College Press (10 pages).

International Preliminary Report on Patentability re PCT/US2014/031250, dated Oct. 1, 2015 (8 pages).

Notice of Allowance for U.S. Appl. No. 15/657,407 dated Mar. 25, 2020, 13 pages.

Final Office Action for U.S. Appl. No. 15/657,407 dated Nov. 20, 2019, 24 pages.

Girard et al., "Soft two-degree-of-freedom dielectric elastomer position sensor exhibiting linear behavior.", IEEE/ASME Transactions on Mechatronics 20.1, vol. 20, Issue 1, Mar. 4, 2014, pp. 105-114.

\* cited by examiner

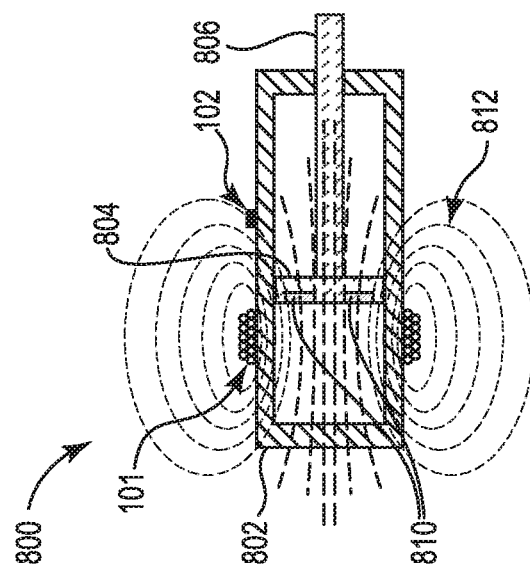
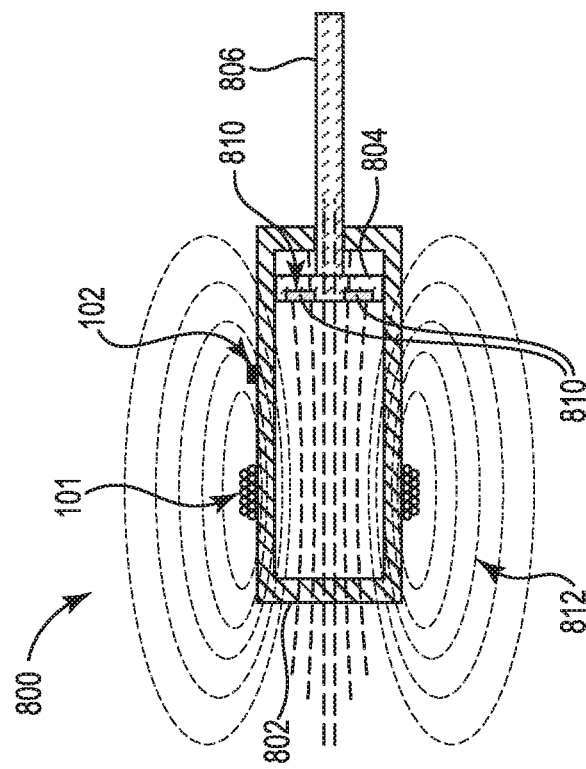
Fig. 8A
Fig. 8B

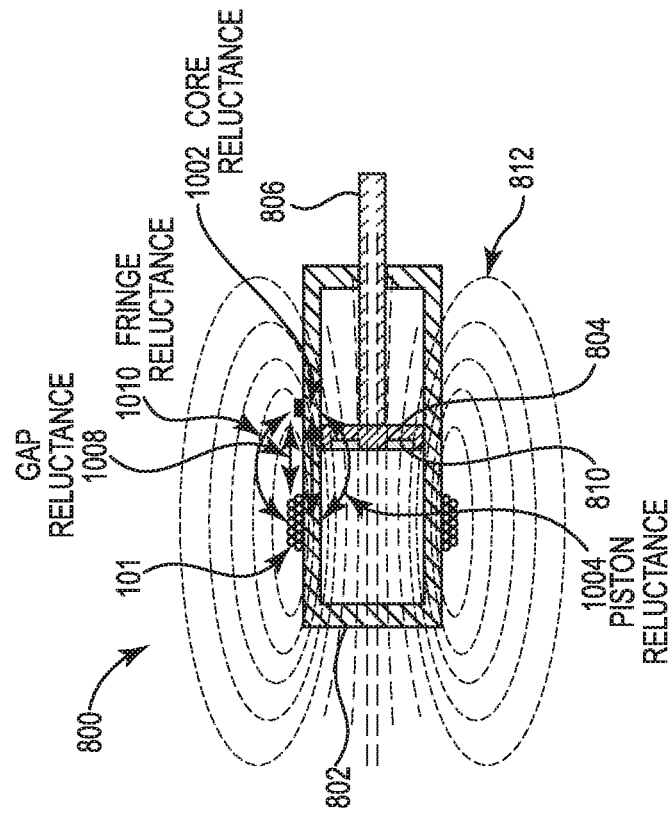
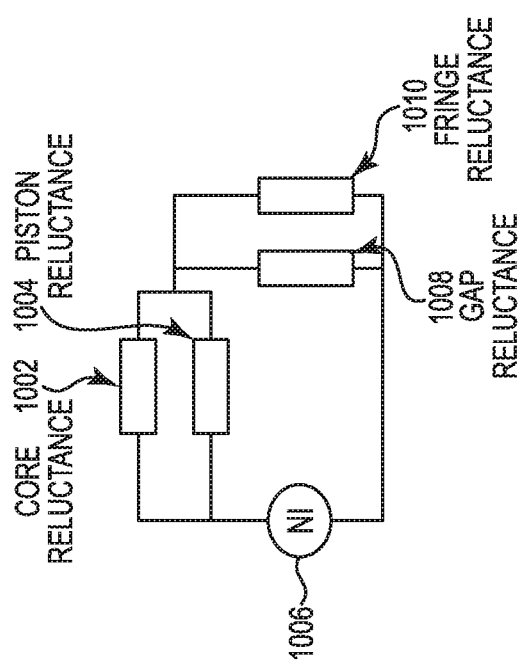
Fig. 10B
Fig. 10A

POSITION SENSING SYSTEM WITH AN ELECTROMAGNET

CROSS-REFERENCE TO RELATED APPLICATIONS

This Application is a continuation-in-part of Non-Provisional patent application Ser. No. 15/657,407, filed Jul. 24, 2017, which claims the benefit of the filing date of U.S. Provisional Patent Application Ser. No. 62/365,829, filed Jul. 22, 2016, the entire teachings of which are incorporated herein by reference.

GOVERNMENT INTEREST

This invention was made with government support under IIP-1601644 awarded by National Science Foundation. The government has certain rights in the invention.

BACKGROUND

Potentiometers, linear variable differential transformers (LVDTs), lasers, and LED based systems may be used for position measurement. In general, the LVDT and potentiometer type of sensors require a mechanical connection between the moving object and the sensor. Hence, it is not possible to use these sensors in a case where the moving object is isolated, such as a piston moving inside an engine. Making the mechanical connection requires modification of the design of the system, requires assembly, and can expose the sensors to a harsh environment where their performance reduces. Another limitation of these types of sensors is that the size of the sensor increases as the range of measurement increases.

Laser and LED sensors do not require mechanical connection. However, they require a clear line of sight to the moving object. Hence, their application becomes limited in cases where the moving object is optically isolated. Another requirement of the sensor is that the surface of the moving object should reflect a certain percentage of the laser beam. Laser and LEDs that provide sub-mm level accuracy are highly expensive.

Some position measurement systems that are based on magnetic fields only provide a binary measurement of position (e.g., an indication of whether the object is to the left or the right of the sensor), and do not provide a continuous measurement of position. Some position measurement systems that are based on magnetic fields require installation of an extra magnet on the moving object, and an array of magnetic sensor devices is placed adjacent to the moving object. In such a system, the required short gap (i.e., 0.5 mm to 5.5 mm) between the magnetic sensor and the moving object limits the applicability of the sensor in cases where a thicker isolation of the moving object is required. Another major drawback of such a system is that the size of the sensor increases with the increase in the range of measurement of the sensor. For example, if it is desired to measure the position of a hydraulic piston whose range of motion is 500 mm, the length of the sensor should be at least 500 mm. In some systems, the size of the magnets attached to the moving object are different based on the desired range of motion, and can be as large as 20 mm in diameter and 7 mm in thickness, limiting the placement of magnets in a moving piston in an engine or a hydraulic cylinder. Some of these systems also have poor linearity. The accuracy of magnetic sensors can be adversely affected by external magnetic objects coming close to the sensors.

Position sensors based on magnetic fields from permanent magnets can suffer from error due to disturbances from ferromagnetic objects. If a ferromagnetic object or other magnetic object happens to appear in the vicinity of the sensor, the position measurement of the sensor can have significant errors. Embodiments disclosed herein are directed to a position measurement sensor based on an electromagnet that has significant robustness to disturbances from ferromagnetic objects, metallic objects and permanent magnet based disturbances.

BRIEF DESCRIPTION OF THE DRAWINGS

FIGS. 8A and 8B are diagrams illustrating a second electromagnet-based position sensing configuration for the position measurement system shown in FIG. 1 according to one embodiment.

FIG. 10A is a schematic diagram illustrating the various components that comprise the total magnetic reluctance between the electromagnet and the magnetic sensor in the configuration shown in FIGS. 8A and 8B according to one embodiment.

FIG. 10B is a diagram showing the location of the reluctance elements shown in FIG. 10A according to one embodiment.

DETAILED DESCRIPTION

Figure 1:
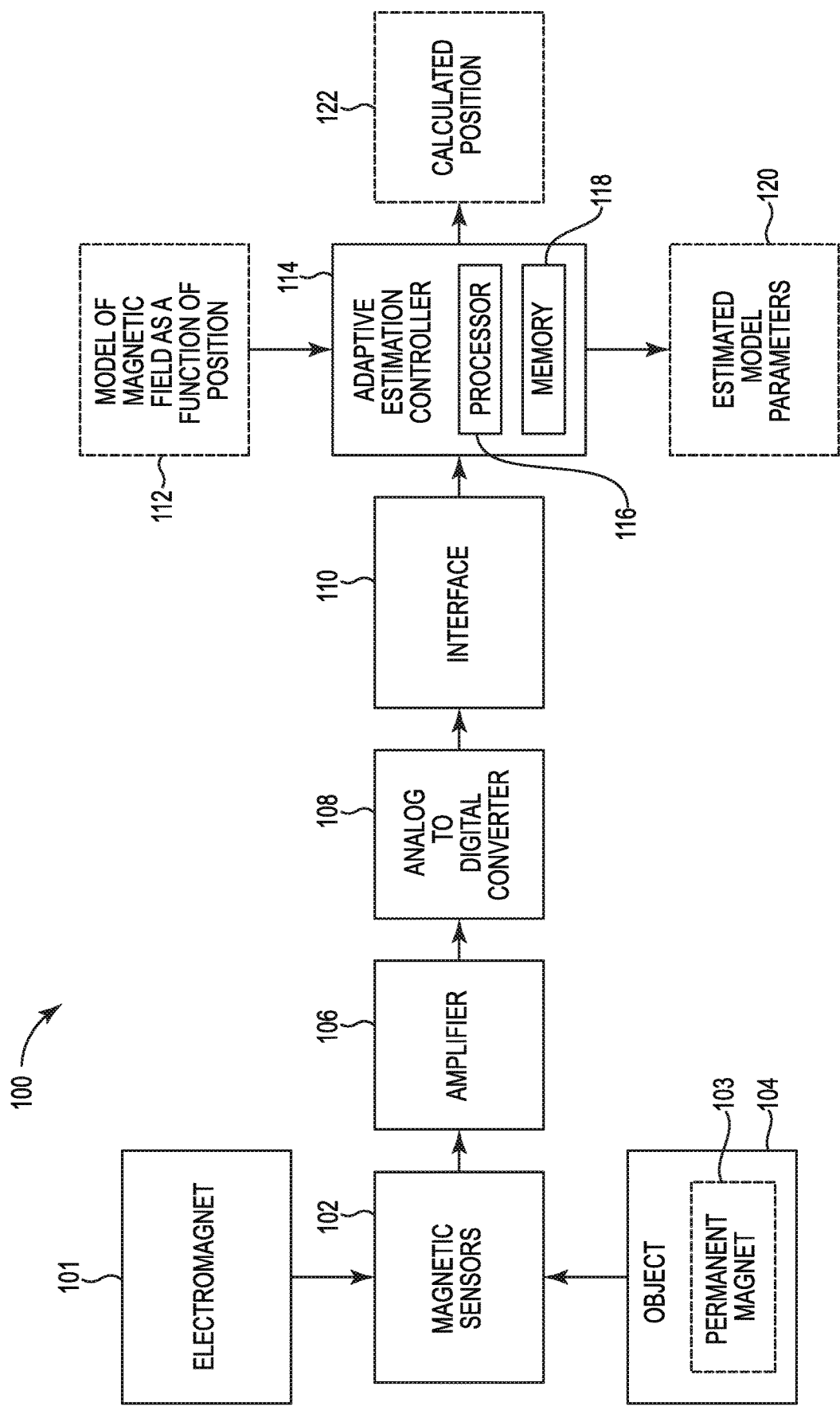
FIG. 1 is a block diagram illustrating a position measurement system according to one embodiment.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

One embodiment is directed to a position sensing system and method for the non-intrusive real-time measurement of the position of a moving object, such as piston position inside a cylinder. The system includes an electromagnet to generate an alternating magnetic field, at least one magnetic sensor for measuring an intensity of a magnetic field, and a processor or controller for estimating the position of the moving object based on the measured magnetic field.

Some embodiments may use a nonlinear model of the magnetic field produced by the object as a function of position around the object. The inherent magnetic field of a metallic object can be used to compute the position of the object. Any ferromagnetic object has an inherent magnetic field and this field varies as a function of the position around the object. If the magnetic field can be analytically obtained as a function of the position, the field intensity can be measured using sensors and then the position of the object computed from it. Some embodiments disclosed herein may model the magnetic field around a metallic object as a function of position and use this model to estimate position from magnetic field measurements.

The parameters in the magnetic field versus position function are unique to the particular object under consideration. While the functional form will remain the same for objects of the same shape and size, the parameters in the function can vary from one object to another due to the varying strength of magnetization. The parameters of the nonlinear model may be auto-calibrated or adaptively estimated by the system using an additional redundant sensor and redundant magnetic field measurements. Some embodiments disclosed herein use an adaptive estimation algorithm that utilizes redundant magnetic sensors to both estimate parameters and the position.

One embodiment includes one or more of the following components: (1) an electromagnet to generate an alternating magnetic field; (2) a set of magnetic field measurement sensors, longitudinally or laterally separated with known distances between them; (3) a nonlinear model of the magnetic field around the object under consideration, as a function of the position around the object; (4) a method to calculate the position of the object based on measurements of the magnetic field, and based on the magnetic field as a function of position from the model; and (5) a method to adaptively estimate the parameters of the model by use of multiple longitudinally/laterally separated redundant sensors.

FIG. 1 is a block diagram illustrating a position measurement or sensing system 100 according to one embodiment. System 100 includes electromagnet 101, magnetic sensors 102, amplifier 106, analog to digital converter 108, interface 110, adaptive estimation controller 114, and a model of magnetic field as a function of position 112. System 100 is configured to measure the position of object 104 as the object 104 moves. In some embodiments, the object 104 may include a permanent magnet 103, and in other embodiments, the object 104 may not include the permanent magnet 103.

In operation according to one embodiment, electromagnet 101 produces a magnetic field, and the magnetic sensors 102 continuously measure the magnetic field intensity at the location of the sensors 102. The measured magnetic field intensity varies as the object 104 moves. In one embodiment, the sensors 102 include two or more magnetic field sensors in a known configuration. Magnetic sensors 102 generate analog measurements based on the sensed magnetic field intensity, and output the analog measurements to amplifier 106, which amplifies the analog measurements. Amplifier 106 outputs the amplified analog measurements to analog to digital converter 108, which converts the amplified analog measurements to digital measurement data. Converter 108 outputs the digital measurement data to controller 114 via interface 110. In one embodiment, interface 110 is a wireless interface. In another embodiment, interface 110 is a wired interface.

Based on the received digital measurement data and the model 112, controller 114 performs an adaptive estimation method to calculate estimated model parameters 120. Using the calculated parameters 120 in the model 112, controller 114 continuously generates calculated position data 122 based on received digital measurement data. The calculated position data 122 provides a real-time indication of the current position of the object 104. In one embodiment, after calculating the estimated model parameters 120, controller 114 is also configured to periodically update these parameters 120 during normal sensing operations of the system 100.

In one embodiment, controller 114 comprises a computing system or computing device that includes at least one processor 116 and memory 118. Depending on the exact configuration and type of computing device, the memory 118 may be volatile (such as RAM), non-volatile (such as ROM, flash memory, etc.), or some combination of the two. The memory 118 used by controller 114 is an example of computer storage media (e.g., non-transitory computer-readable storage media storing computer-executable instructions for performing a method). Computer storage media used by controller 114 according to one embodiment includes volatile and nonvolatile, removable and non-removable media implemented in any suitable method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by controller 114.

One example of position sensing system 100 estimates the position of a piston inside a cylinder. In this example, the piston is the moving object 104. Hydraulic actuators, pneumatic actuators, IC engine and free piston engines are examples of piston-cylinder applications. Another example is a rotary actuator, in which the moving object 104 is the rotor, and the magnetic sensors 102 may be located on the stator (or housing) of the actuator. Yet another example is the use of a magnet to identify a specific location and then subsequent use of the magnetic sensors 102 to determine the 3-dimensional position of that marked location.

When a foreign ferromagnetic object happens to come close to the sensors 102, the foreign object's magnetic field may create a disturbance, which distorts the relationship between the location of the original object 104 and its magnetic field. If the foreign ferromagnetic object remains stationary, then the error in the original magnetic field function is a constant at each sensor location. If the ferromagnetic object moves, then the error in the original magnetic field function is time-varying.

In order to overcome the problem of errors caused by disturbances from ferromagnetic objects, embodiments disclosed herein utilize an electromagnet 101 as a part of the position sensing system 100. In the embodiments described below, the moving object 104 is assumed to be a piston inside a cylinder, and the system 100 uses an electromagnet-based method of disturbance rejection.

In one embodiment, system 100 makes use of alternating current (AC) magnetic fields instead of time-invariant magnetic fields. In some embodiments, the electromagnet 101 is placed on the moving piston while the magnetic sensors 102 are placed on the cylinder. In some other embodiments, the magnetic sensors 102 are placed on the moving piston while the electromagnet 101 is placed on the cylinder.

Figure 2:
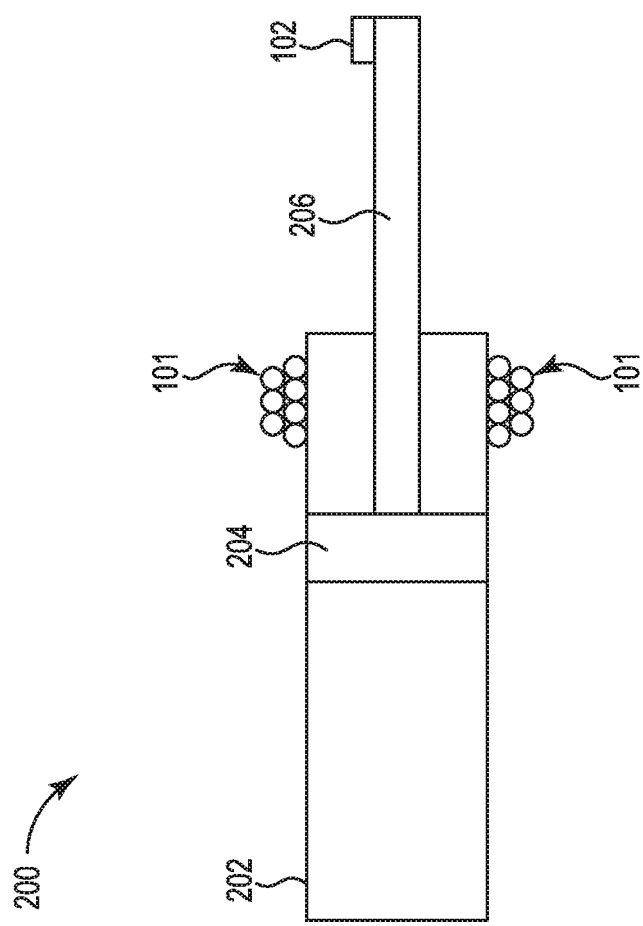
FIG. 2 is a diagram illustrating a first electromagnet-based position sensing configuration for the position measurement system shown in FIG. 1 to measure the position of a piston according to one embodiment.

FIG. 2 is a diagram illustrating a first electromagnet-based position sensing configuration 200 for the position measurement system 100 shown in FIG. 1 to measure the position of a piston 204 according to one embodiment. The electromagnet 101 (e.g., comprising a coil of wires) is wrapped around a static hydraulic cylinder 202, and the magnetic sensors 102 are installed externally on the moving piston rod 206. The position of the piston 204 may be estimated as described in further detail below with reference to FIG. 3.

Figure 3:
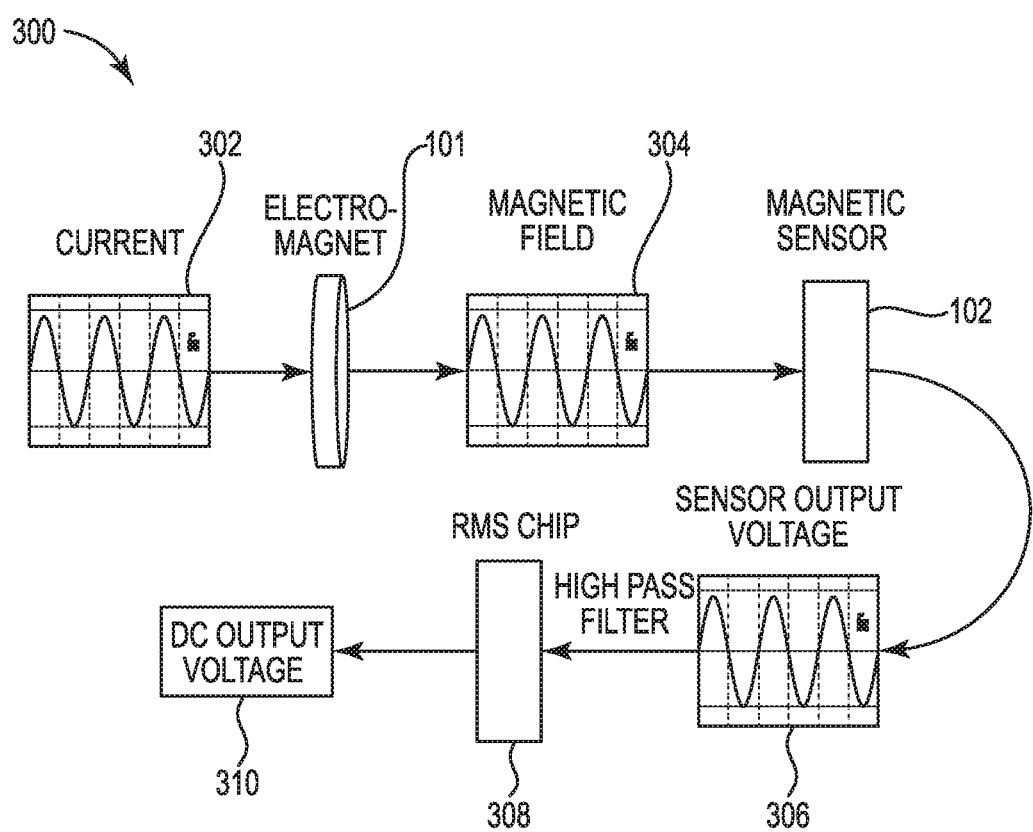
FIG. 3 is a diagram illustrating a position estimation method according to one embodiment.

FIG. 3 is a diagram illustrating a position estimation method 300 according to one embodiment. An alternating current 302 is used to power the electromagnet 101. This creates an alternating magnet field 304 of a known frequency. In one embodiment, the frequency of the magnetic field 304 is chosen to be high enough to be above the bandwidth of frequencies in which piston motion is expected. The magnetic field intensity of magnetic field 304 is measured by magnetic sensors 102, which produce a corresponding sensor output voltage 306.

As the piston 204 and the piston rod 206 move, the distance between the sensors 102 and the electromagnet 101 changes. The change in magnetic field amplitude that occurs with a change in distance can be modeled as well as measured experimentally. The change in amplitude provides the mechanism for distance measurement. The amplitudes of the magnetic field at the pre-determined frequency are measured in real-time using either a frequency demodulation chip, such as root mean square (RMS) chip 308, or by adequately fast real-time sampling, and then output as a corresponding DC output voltage 310. The distance between the sensors 102 and the electromagnet 101 are then estimated using adaptive estimation algorithms.

Robustness to ferromagnetic disturbances is obtained by the fact that only amplitudes of the alternating magnetic field at a particular frequency are used in distance estimation. The presence of ferromagnetic disturbances causes a change in the magnetic field which is at a much lower frequency than the operating electromagnet frequency. For example, a disturbance might manifest as a change in bias or DC value of the measured magnetic fields. Since the DC value of the magnetic fields is not utilized, the ferromagnetic disturbance does not cause any errors in the position estimate. It should also be noted that the algorithms and electronics used to obtain the real-time amplitudes at the operating frequency are fast and do not cause any significant transient errors in estimation. This method works very effectively for disturbance rejection and provides excellent performance.

Figure 4:
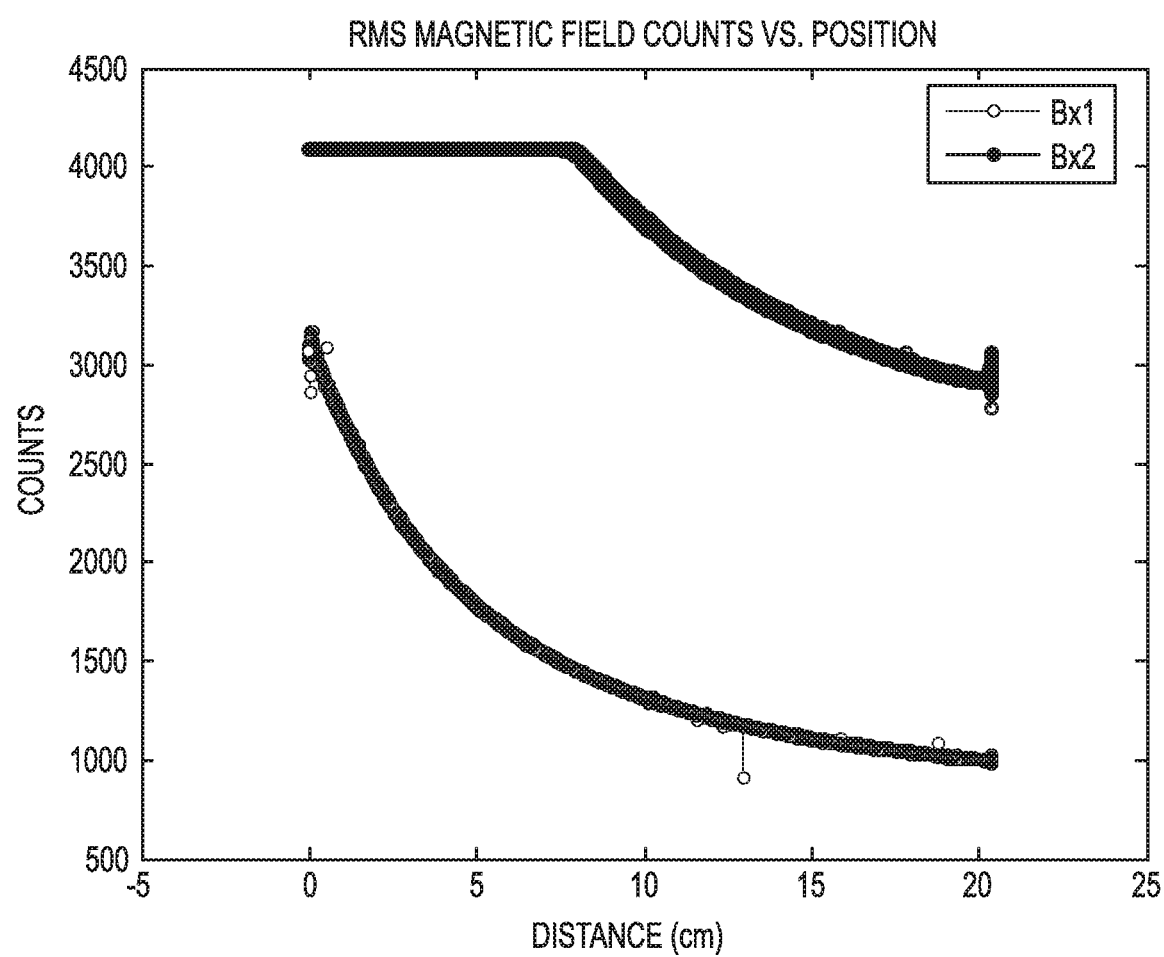
FIG. 4 is a diagram illustrating a graph of example data measured experimentally for the first electromagnet-based position sensing configuration shown in FIG. 2.

FIG. 4 is a diagram illustrating a graph of example data measured experimentally for the first electromagnet-based position sensing configuration 200 shown in FIG. 2. The vertical axis represents magnetic field amplitude (in counts) for two magnetic fields Bx1 and Bx2 measured respectively by two magnetic sensors 102, and the horizontal axis represents distance (in cm) between the sensors 102 and the electromagnet 101. As shown in FIG. 4, the amplitude of the measured alternating magnetic fields along the longitudinal axis varies as a function of the distances between two magnetic sensors 102 and the electromagnet 101 (at the operating frequency). It can be seen that there is a clear monotonic relationship between amplitude and distance, which enables distance estimation from the amplitude measurement.

Figure 5:
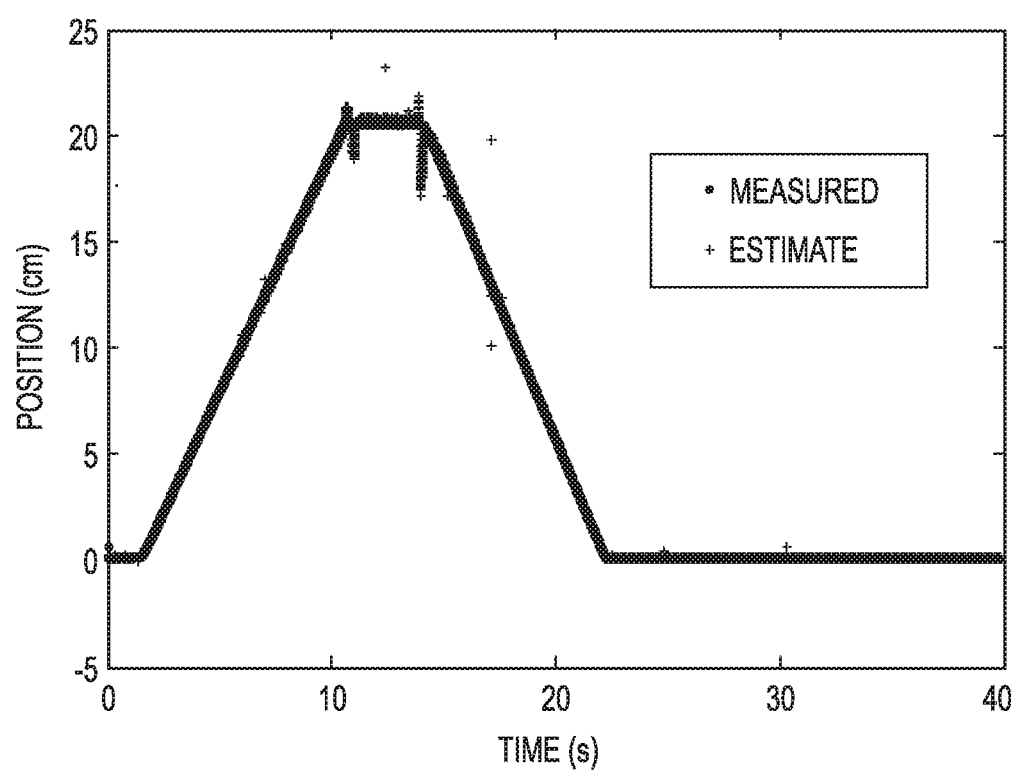
FIG. 5 is a diagram illustrating a graph of position estimates obtained from the first electromagnet-based position sensing configuration shown in FIG. 2, and a comparison with the position estimates from a standard distance measurement sensor.

FIG. 5 is a diagram illustrating a graph of position estimates obtained from the first electromagnet-based position sensing configuration 200 shown in FIG. 2, and a comparison with the position estimates from a standard distance measurement sensor. The standard distance measurement sensor that was used was a highly accurate and expensive sonar designed for this particular distance measurement range. The vertical axis represents position (in cm) and the horizontal axis represents time (in seconds). It can be seen that the distance estimates ("Estimate" data) from the electromagnet based sensor compare well with the distance measurements ("Measured" data) from the reference sensor.

Figure 6:
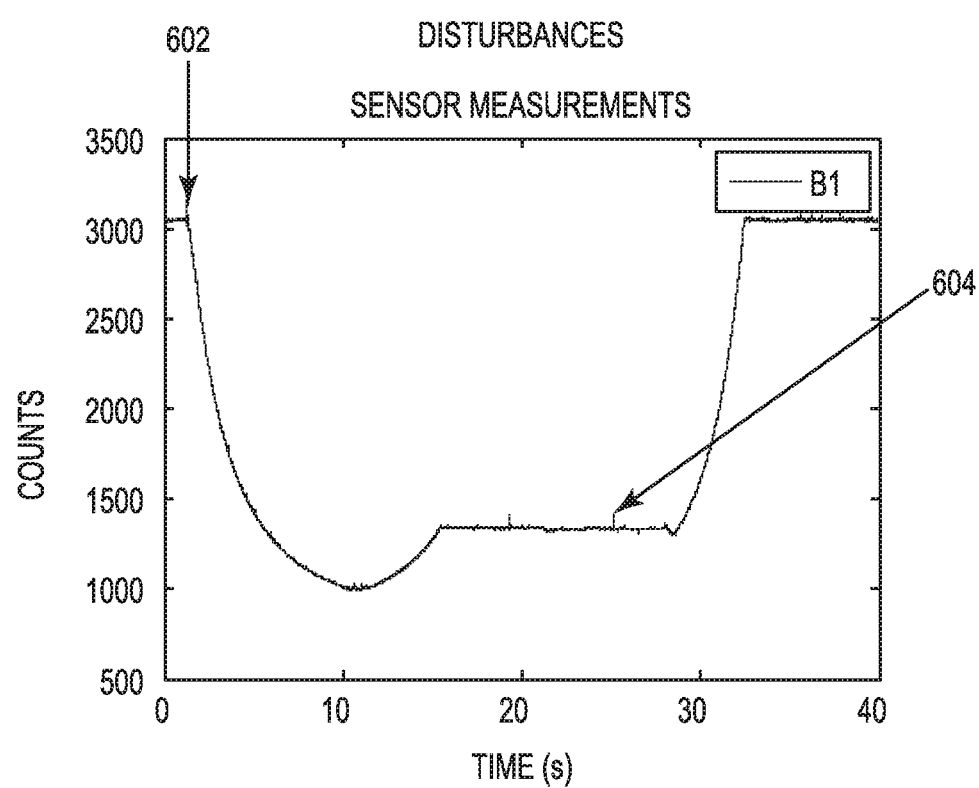
FIG. 6 is a diagram illustrating a graph of the influence of a ferromagnetic disturbance on the magnetic field amplitudes at the operating frequency for the first electromagnet-based position sensing configuration shown in FIG. 2.

FIG. 6 is a diagram illustrating a graph of the influence of a ferromagnetic disturbance on the magnetic field amplitudes at the operating frequency for the first electromagnet-based position sensing configuration 200 shown in FIG. 2. The vertical axis represents magnetic field amplitude (in counts) for a magnetic field B1 measured by one of the magnetic sensors 102, and the horizontal axis represents time (in seconds). A large wrench was used as the ferromagnetic disturbance. The start of motion deviation is indicated at 602, and it is indicated at 604 that the wrench introduced only small deviations from the model curve. While the wrench causes a significant change in magnetic fields, it does not cause a change in amplitude of the magnetic field at the high operating frequency of the electromagnet 101.

Figure 7:
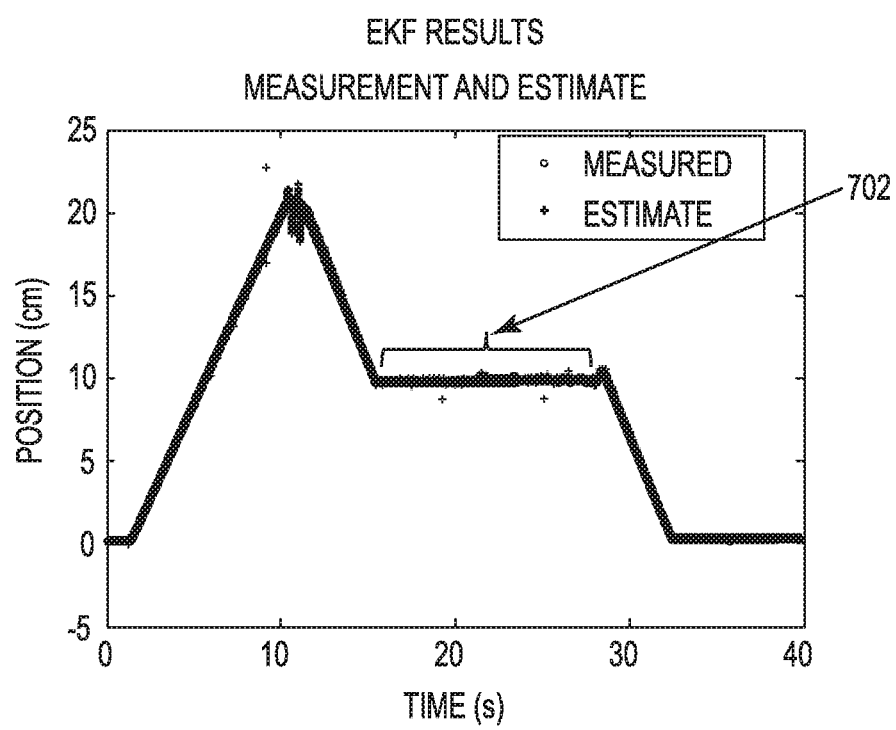
FIG. 7 is a diagram illustrating a graph that shows the robustness to ferromagnetic disturbances of the first electromagnet-based position sensing configuration shown in FIG. 2.

FIG. 7 is a diagram illustrating a graph that shows the robustness to ferromagnetic disturbances of the first electromagnet-based position sensing configuration 200 shown in FIG. 2. The vertical axis represents position (in cm), and the horizontal axis represents time (in seconds). The graph shows distance estimates ("Estimate" data) for the electromagnet based sensor, and the distance measurements ("Measured" data) from the reference sensor. During the period between 13 and 30 seconds in the data, a large ferromagnetic wrench was waved near the sensors 102 and then placed right next to the cylinder 202. As shown in the graph at 702, the introduction of the wrench causes barely any changes in position estimates.

The first electromagnet-based position sensing configuration 200 shown in FIG. 2 provides several benefits, including the following: (1) The configuration provides external disturbance rejection and is robust to the introduction or presence of foreign ferromagnetic objects; and (2) the sensors 102 are completely external, and the configuration does not require the installation of a permanent magnet to the piston, so the sensor system can thus be easily installed or retro-fitted on existing old cylinders.

If the sensors 102 are placed on the moving object (and the electromagnet 101 is placed on the stationary part of the cylinder 202) as shown in FIG. 2, the sensors 102 can be powered using a rechargeable battery. One approach is to recharge the battery whenever the system is not in use and the piston rod 206 is withdrawn fully into the cylinder 202, so that the external electronics are closest to the stationary part of the cylinder 202. Automatic or inductive charging of the electronics in this withdrawn configuration may be implemented.

FIGS. 8A and 8B are diagrams illustrating a second electromagnet-based position sensing configuration 800 for the position measurement system 100 shown in FIG. 1 according to one embodiment. Sensing configuration 800 does not require power to be supplied to the moving object. FIG. 8A shows the piston 804 in a first position, and FIG. 8B shows the piston 804 in a second position.

As shown in FIGS. 8A and 8B, the electromagnet 101 is placed around the cylinder 802, and the magnetic sensor 102 is also placed on the cylinder 802 a known distance away from the electromagnet 101. A permanent ring magnet 810 is placed on the piston 804. Electromagnet 101 generates an alternating magnetic field, which is represented by alternating magnetic field lines 812.

Figure 9A:
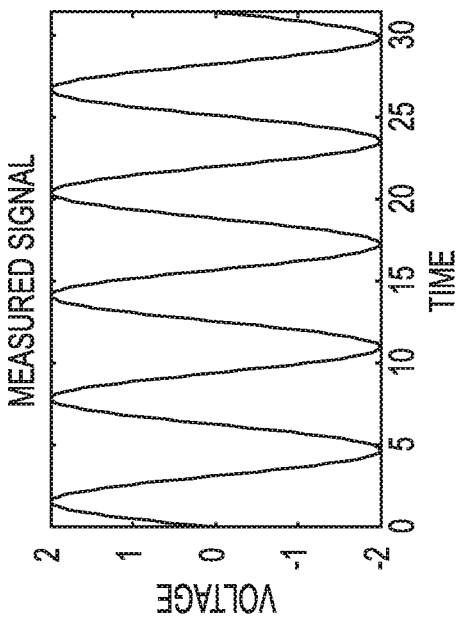
FIG. 9A is a diagram illustrating a graph of the position signal sensed by the sensor for the piston position shown in FIG. 8A.
Figure 9B:
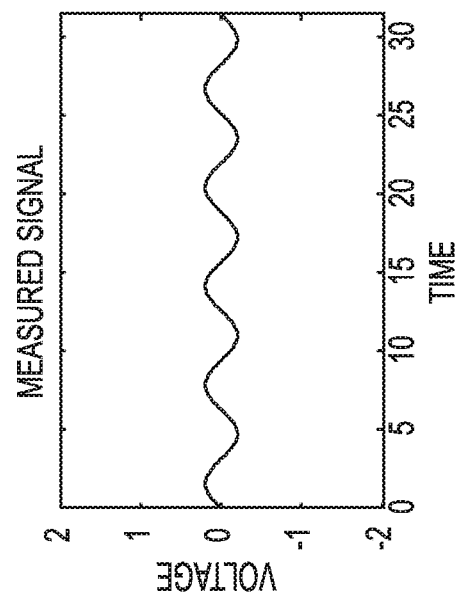
FIG. 9B is a diagram illustrating a graph of the position signal sensed by the sensor for the piston position shown in FIG. 8B.

FIG. 9A is a diagram illustrating a graph of the position signal sensed by the sensor 102 for the piston position shown in FIG. 8A. FIG. 9B is a diagram illustrating a graph of the position signal sensed by the sensor 102 for the piston position shown in FIG. 8B. The vertical axis represents voltage, corresponding to position, and the horizontal axis represents time. As shown, the magnitude of the illustrated signals varies based on piston position.

The RMS value of the AC magnetic field read by the magnetic sensor 102 for configuration 800 will not be a constant, but will depend on the location of the piston 804. This is because the magnetic reluctance of the system is influenced by the piston 804.

FIG. 10A is a schematic diagram illustrating the various components that comprise the total magnetic reluctance between the electromagnet 101 and the magnetic sensor 102 in the configuration 800 shown in FIGS. 8A and 8B according to one embodiment. FIG. 10B is a diagram showing the location of the reluctance elements shown in FIG. 10A according to one embodiment. The permanent magnet 810 on the piston 804 and its location comprise the piston reluctance 1004, which is being utilized here for piston position estimation. The reluctance of the cylinder 802 is referred to as the core reluctance 1002. The flux through the air can be considered the gap reluctance 1008 plus some fringe reluctance 1010. NI 1006 represents the number of turns (N) in the electromagnet 101 times the current (I) through the electromagnet 101.

The magnetic reluctance of the piston 804 is lower than that of air. The total magnetic reluctance between the electromagnet 101 and the magnetic sensor 102 depends on the magnetic reluctance of air (leakage), the core reluctance 1002 of the cylinder 802, and the magnetic reluctance of the permanent magnet 810. Since the location of the magnet 810/piston 804 influences the reluctance, the RMS value of the AC field read by the sensor 102 is influenced by the piston location, and can therefore be used to estimate piston position.

Figure 11:
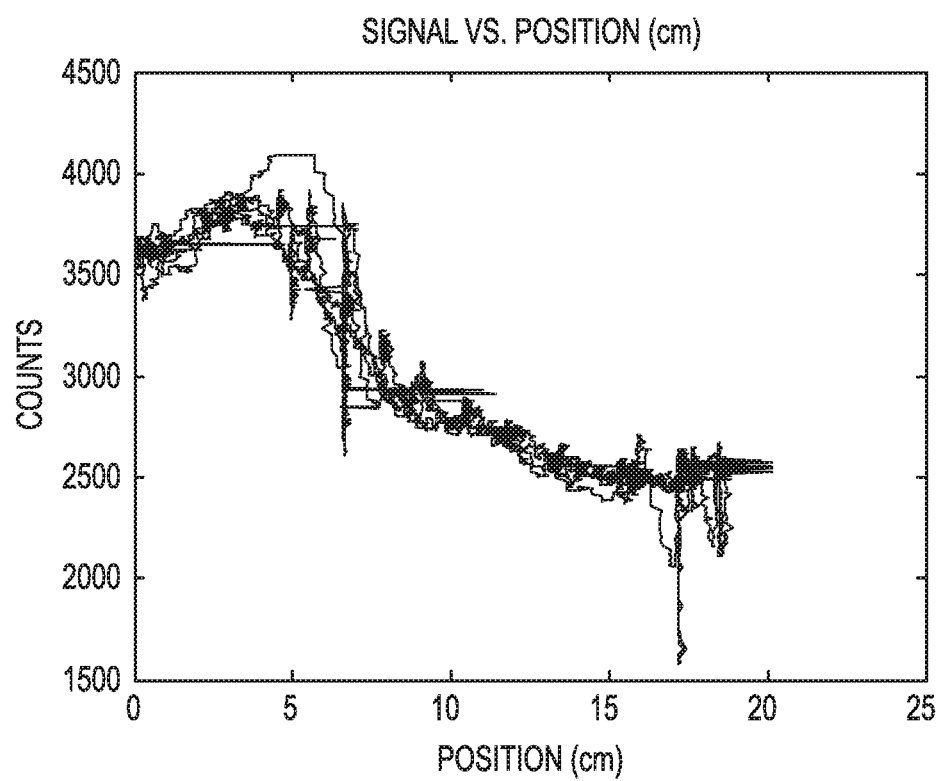
FIG. 11 is a diagram illustrating a graph of the RMS value of the magnetic field sensed by the sensor in an experimental implementation of the configuration shown in FIGS. 8A and 8B versus piston position.

FIG. 11 is a diagram illustrating a graph of the RMS value of the magnetic field sensed by the sensor 102 in an experimental implementation of the configuration 800 versus piston position. The vertical axis represents magnetic field amplitude (in counts) measured by magnetic sensor 102, and the horizontal axis represents position (in cm). The RMS value is generated by passing the signal from the sensor 102 through an instrumentation amplifier, a high pass filter, and then an RMS filter chip. There is a clear invertible relationship between RMS magnitude and piston position.

While the configuration 800 has been shown to work and is able to estimate position, some implementations may not be as immune to disturbances as the moving electromagnet configuration 200 shown in FIG. 2. This is due to the fact that the position sensing configuration here measures the "disturbance" caused by the piston to the alternating field, so the sensor may also pick up a disturbance by another object in the same region. In an experimental implementation, the system appeared to only pick up foreign disturbances when the disturbance object was placed between the sensor 102 and the electromagnet 101. This can be remedied by packaging the sensor 102 with the electromagnet 101 in such a way that no object could come between the two.

Benefits of the configuration 800 include the fact that the system does not require any power to be provided to a moving object. Both the electromagnet 101 and the magnetic sensor(s) 102 are located on the stationary cylinder 802. In addition, the configuration 800 provides external disturbance rejection when the disturbance is outside the region between the electromagnet 101 and the sensor 102.

Figure 12:
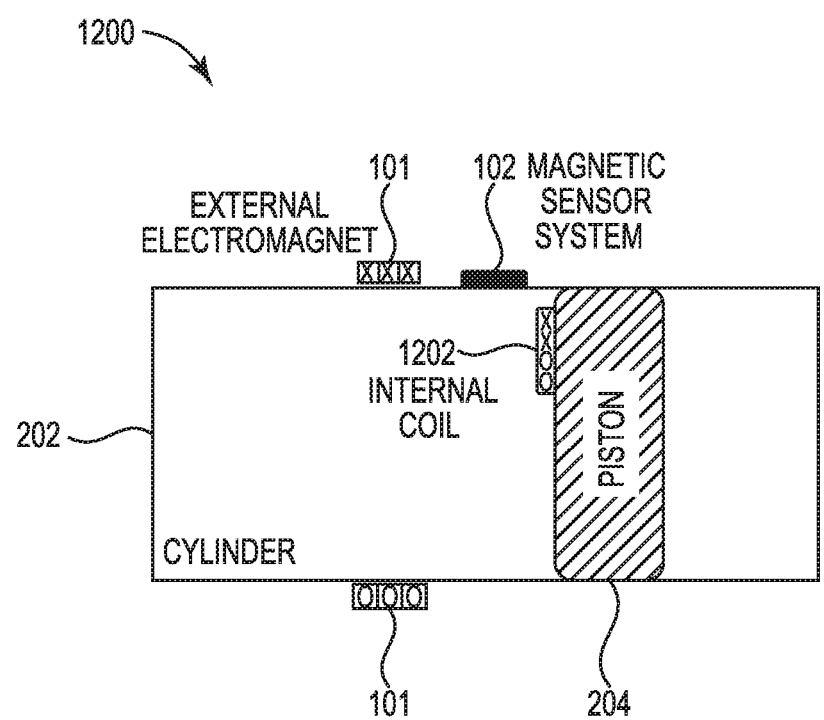
FIG. 12 is a diagram illustrating a third electromagnet-based position sensing configuration for the position measurement system shown in FIG. 1 according to one embodiment.

FIG. 12 is a diagram illustrating a third electromagnet-based position sensing configuration 1200 for the position measurement system 100 shown in FIG. 1 according to one embodiment. Configuration 1200 provides immunity from disturbances, and does not require power to be supplied to the moving object. Configuration 1200 has the potential to be completely immune to magnetic disturbances introduced anywhere in the neighborhood of the piston-cylinder system. As shown in FIG. 12, external electromagnet 101 is located on the outside surface of cylinder 202. A single magnetic sensor 102 is located near the electromagnet 101 on the outside surface of the cylinder 202. An internal inductive coil 1202 is located on the moving piston 204. In one embodiment, the inductive coil 1202 is a coil of unconnected wire that is not connected to any power source.

Figure 13:
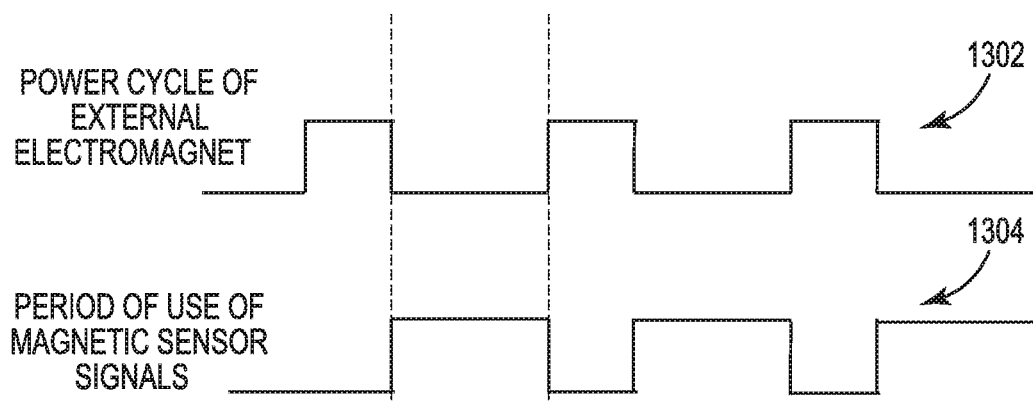
FIG. 13 is a diagram illustrating the duty cycle for powering the external electromagnet shown in FIG. 12 according to one embodiment.

FIG. 13 is a diagram illustrating the duty cycle for powering the external electromagnet 101 shown in FIG. 12 according to one embodiment. Waveform 1302 is the power cycle of the electromagnet 101, and waveform 1304 is the period of use of the magnetic sensor signals. During the ON portion of the duty cycle waveform 1302, the external electromagnet 101 is powered by an alternating current with a sufficiently high frequency equal to the resonant frequency of the internal inductive coil 1202, and the magnetic sensor 102 is not used. This ensures that maximum inductive coupling occurs between the external electromagnet 101 and the internal coil 1202. During the OFF portion of the duty cycle waveform 1302, the magnetic sensor 102 is used to measure the magnetic field of the system. Since the only electric current at this time is the current induced in the internal coil 1202, the magnetic sensor 102 reads the magnetic field of the internal coil 1202. The strength of the measured magnetic field depends monotonically on the distance between the coil 1202/piston 204 and the sensor 102.

The configuration 1200 is immune to ferromagnetic disturbances because it only utilizes the alternating magnetic signal at the pre-determined resonant frequency of the internal coil 1202. All other magnetic signals are ignored. Any other static or moving ferromagnetic objects will not create a magnetic field at this frequency and will therefore not influence the position measurement system.

Figure 14:
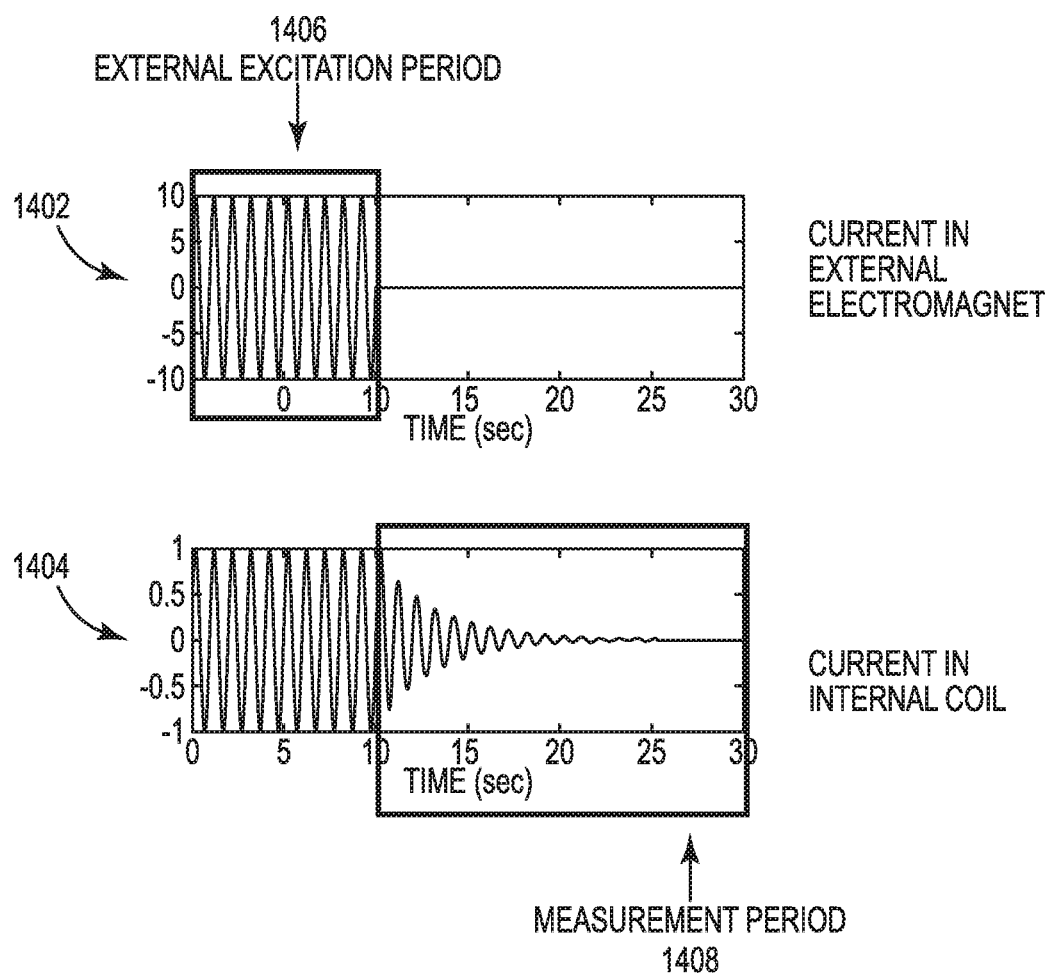
FIG. 14 is a diagram illustrating an example alternating current in the external electromagnet and a corresponding current in the internal coil for the configuration shown in FIG. 12 according to one embodiment.

FIG. 14 is a diagram illustrating an example alternating current 1402 in the external electromagnet 101 and a corresponding current 1404 in the internal coil 1202 for the configuration 1200 shown in FIG. 12 according to one embodiment. The internal coil 1202 is excited by the electromagnet 101 during external excitation period 1406, and then the magnitude of the current 1404 gradually decreases during measurement period 1408 (when the electromagnet 101 is off). The measurement of the magnetic field is done when only the internal coil 1202 is active and the external electromagnet 101 is off (i.e., during measurement period 1408).

Figure 15A:
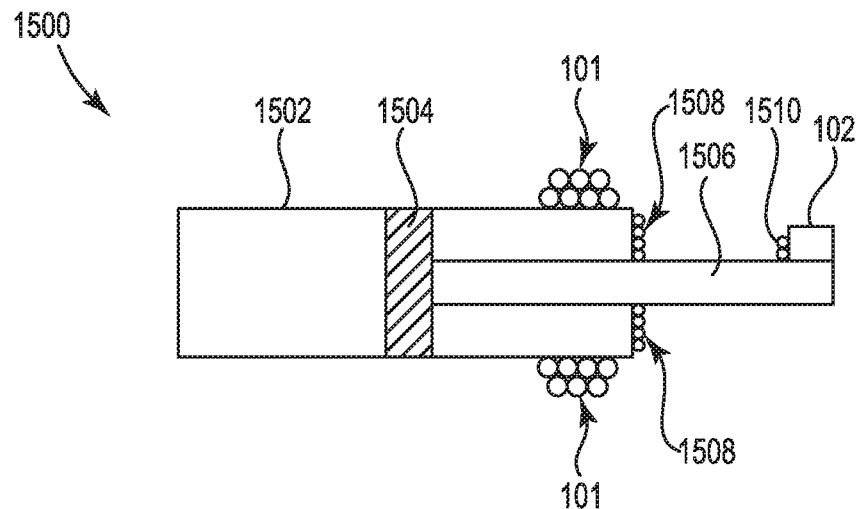
FIGS. 15A and 15B are diagrams illustrating a fourth electromagnet-based position sensing configuration for the position measurement system shown in FIG. 1 according to one embodiment.
Figure 15B:
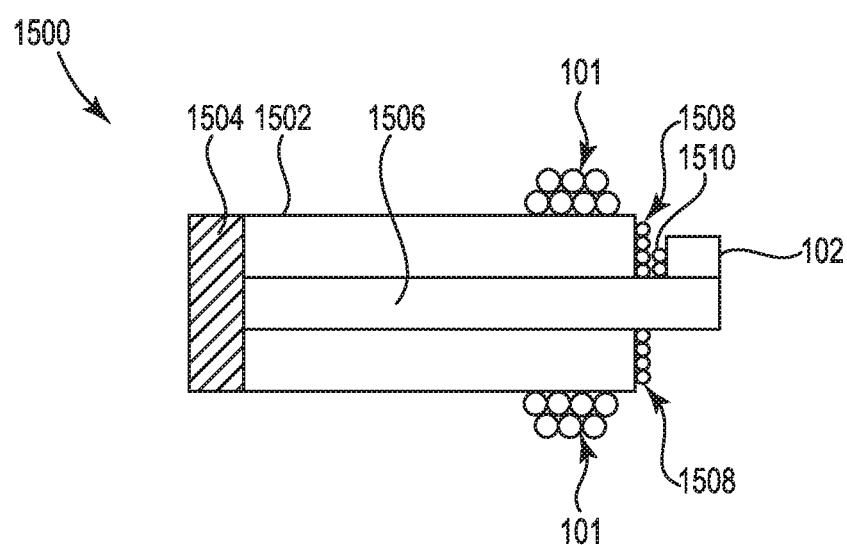

Configuration 1200 provides the ability to have an electromagnet 101 on the moving piston 204, which results in a measurement system that is based on an alternating magnetic field produced by the piston 204 that is immune to ferromagnetic disturbances. In addition, the configuration 1200 does not require that electrical power be connected to the moving piston 204. Rather, the configuration 1200 transfers power inductively. It is noted that the magnetic fields created by the external electromagnet 101 and the internal coil 1202 will both be at the same frequency, but it is desired to only measure the magnetic field due to the internal coil 1202, and not the field due to the external electromagnet 101. This is accomplished using an on-off duty cycle as shown in FIG. 13, and measuring the magnetic field only when the external electromagnet 101 is turned off FIGS. 15A and 15B are diagrams illustrating a fourth electromagnet-based position sensing configuration 1500 for the position measurement system 100 shown in FIG. 1 according to one embodiment. FIG. 15A shows the piston 1504 in a first position, and FIG. 15B shows the piston 1504 in a second position (i.e., a charging position).

As shown in FIGS. 15A and 15B, the electromagnet 101 is wrapped around cylinder 1502, and the magnetic sensor 102 is installed externally on a proximal end of the moving piston rod 1506. In one embodiment, the magnetic sensor 102 is battery-powered with a rechargeable battery, and no wires are connected to the piston 1504. The magnetic sensor 102 and the electromagnet 101 in the illustrated configuration are both external devices, and no components for position measurement are located inside of the cylinder 1502.

An inductive charging coil 1508 is positioned on a proximal end of the cylinder 1502, and an inductive receiver 1510 is positioned on or in the magnetic sensor 102. The inductive charging coil 1508 and the inductive receiver 1510 are used to charge the battery of the magnetic sensor 102. In one embodiment, the battery of the sensor 102 is recharged inductively each time the piston rod 1506 is fully retracted and stationary (e.g., when the piston-cylinder system is not operational, as shown in FIG. 15B). This configuration allows the magnetic sensor 102 to be battery-powered and the battery to be automatically recharged so that the system can keep operating with no wired connections to the components located on the piston rod 1506.

Figure 17:
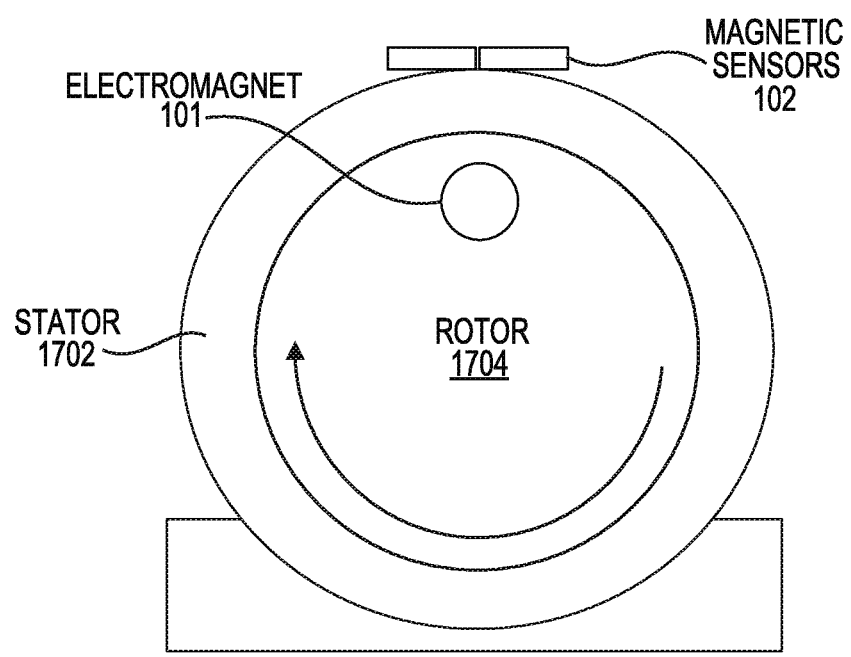
FIG. 17 is a diagram illustrating the measurement of rotational motion by the system shown in FIG. 1 according to one embodiment.

The system 100 (FIG. 1) may also be used to measure rotational motion, with the electromagnet 102 producing an alternating magnetic field, and the magnetic sensors 102 and the controller 114 determining an angular position. FIG. 17 is a diagram illustrating the measurement of rotational motion by the system 100 shown in FIG. 1 according to one embodiment. As shown in FIG. 17, the electromagnet 101 is placed on a rotor 1704, and the magnetic sensors 102 are placed on a stator 1702. In other embodiments, the electromagnet 101 is placed on the stator 1702, and the magnetic sensors 102 are placed on a rotor 1704. The controller 114 (FIG. 1) determines the angular position of the rotor 1704 based on the alternating magnetic field produced by the electromagnet 101 and the magnetic field sensed by the magnetic sensors 102.

Figure 18:
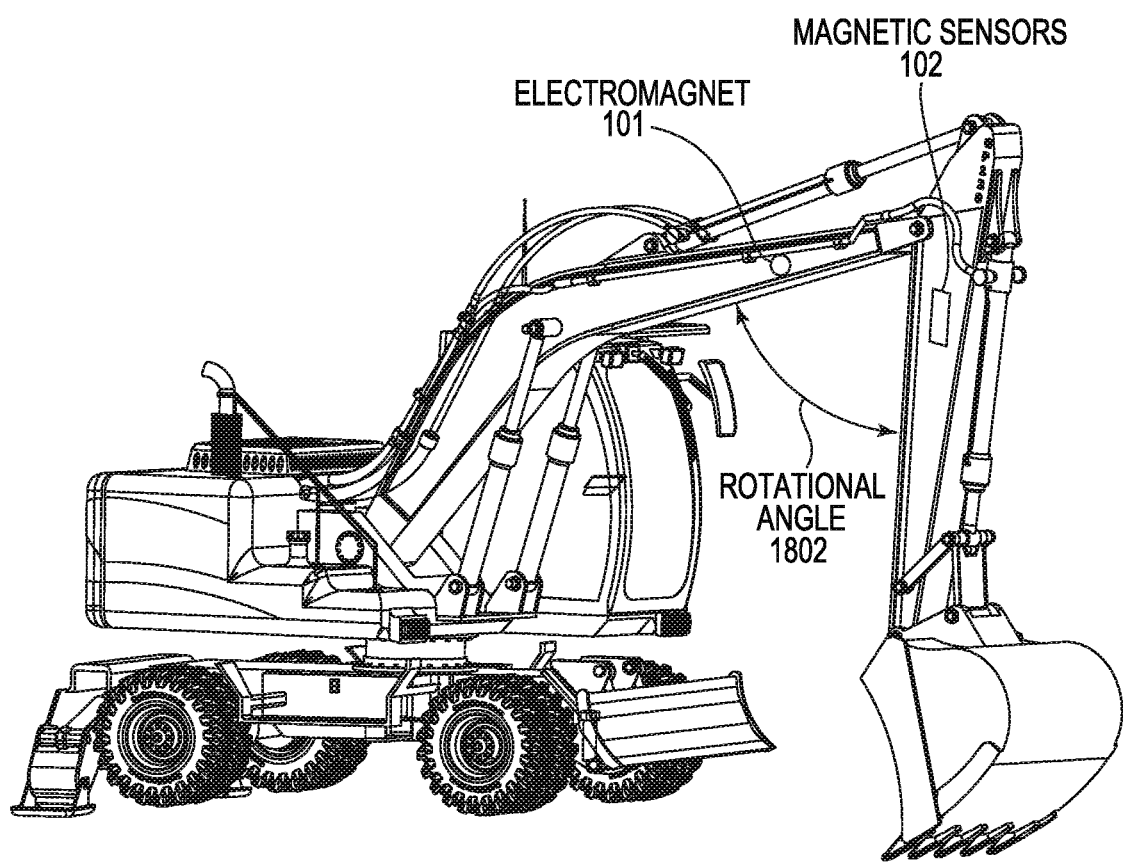
FIG. 18 is a diagram illustrating the measurement of rotational motion by the system shown in FIG. 1 according to another embodiment.

FIG. 18 is a diagram illustrating the measurement of rotational motion by the system 100 shown in FIG. 1 according to another embodiment. As shown in FIG. 18, the electromagnet 101 is placed on a first link of an earth moving vehicle, and the magnetic sensors 102 are placed on a second link of the earth moving vehicle. In other embodiments, the electromagnet 101 is placed on the second link, and the magnetic sensors 102 are placed on the first link. The controller 114 (FIG. 1) determines the rotational angle 1802 between the first and second links based on the alternating magnetic field produced by the electromagnet 101 and the magnetic field sensed by the magnetic sensors 102.

Figure 19:
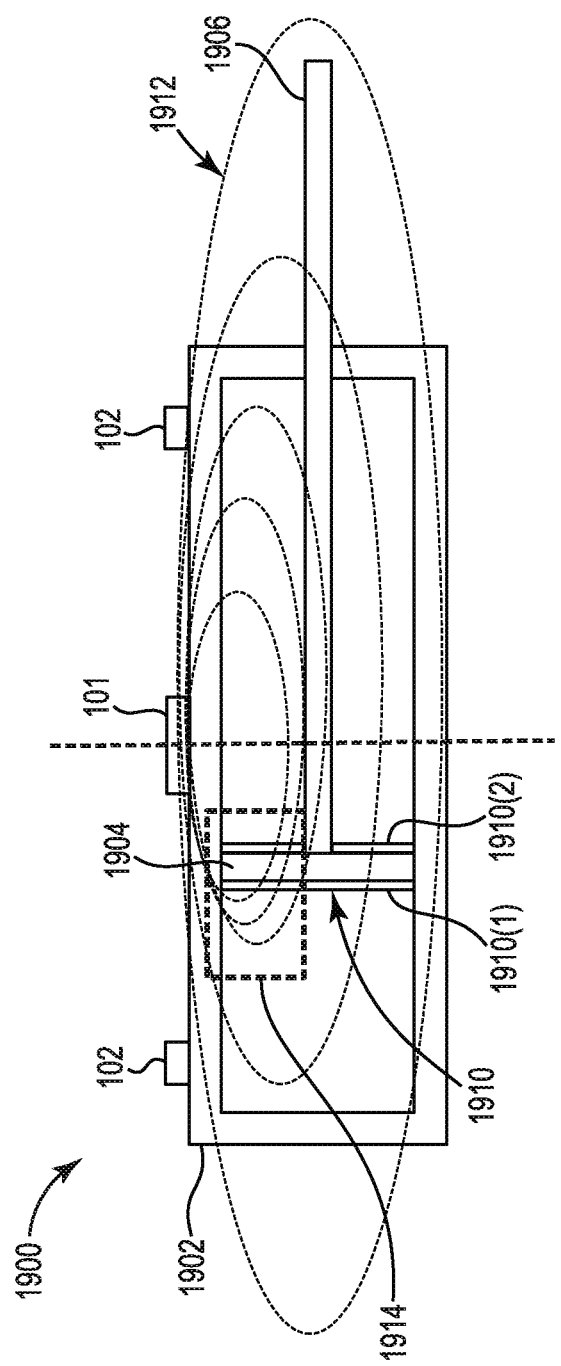
FIG. 19 is a diagram illustrating a fifth electromagnet-based position sensing configuration for the position measurement system shown in FIG. 1 according to one embodiment.

FIG. 19 is a diagram illustrating a fifth electromagnet-based position sensing configuration 1900 for the position measurement system 100 shown in FIG. 1 according to one embodiment. Sensing configuration 1900 does not require power to be supplied to the moving object. As shown in FIG. 19, the electromagnet 101 is placed on the cylinder 1902, and the magnetic sensors 102 are also placed on the cylinder 1902 a known distance away from the electromagnet 101. In one embodiment, the magnetic sensors 102 are 3-axis tunnel magnetoresistance (TMR) sensors. In the illustrated example, one magnetic sensor 102 is placed on each side of the electromagnet 101. In other examples, two or more magnetic sensors 102 are placed on each side of the electromagnet 101, which allows position estimation to be performed over a larger piston stroke length. A high magnetic permeability material 1910 is positioned on the piston 1904. In the illustrated example, the high magnetic permeability material 1910 includes a first portion 1910(1) positioned on a top side of the piston 1904 and a second portion 1910(2) positioned on a bottom side of the piston 1904. The piston rod 1906 is also attached to the bottom side of the piston 1904. The first portion 1910(1) and the second portion 1910(2) may each be formed from one or more thin films. In other examples, the high magnetic permeability material 1910 may include only a single portion 1910(1) or 1910(2) on one side of the piston 1904. In one embodiment, the first portion 1910(1) and the second portion 1910(2) have a circular shape. In another embodiment, the first portion 1910(1) and the second portion 1910(2) have an elliptical shape.

Electromagnet 101 generates an alternating magnetic field, which is represented by alternating magnetic field lines 1912. To measure position of the piston 1904, the magnetic path between the electromagnet 101 and the magnetic sensors 102 is modified based on real-time piston position, which is facilitated by the high magnetic permeability material 1910. Due to the lowest magnetic reluctance path, the highest coupling between the electromagnet 101 and the sensors 102 occurs through the piston 1904. The high magnetic permeability material 1910 increases the magnetic coupling through the moving piston 1904 and enables its position measurement with high sensitivity. The increased coupling caused by material 1910 is indicated in FIG. 19 by a concentration region 1914 of the magnetic field lines 1912. The addition of the high magnetic permeability material 1910 to the moving piston 1904 increases the influence of the moving piston 1904 on the magnetic coupling between the electromagnet 101 and the magnetic sensors 102. In test results, it was shown that the use of the material 1910 increased the sensing accuracy and range (e.g., stroke length) of configuration 1900 compared to a configuration that did not use material 1910. More specifically, piston position was estimated using a Kalman filter, and the estimation error in comparison to a reference sensor was a maximum of 0.13 cm, which is approximately 1.3% maximum, and less than 1% when considered over a 20 cm range.

In one embodiment, the piston 1904 has a stroke length of about 20 cm (i.e., about 10 cm on each side of the electromagnet 101), and the configuration 1900 may sense the position of the piston 1904 anywhere along this stroke length. In another embodiment, the piston 1904 has a stroke length of about 40 cm or larger (i.e., about 20 cm or more on each side of the electromagnet 101), and the configuration 1900 may sense the position of the piston 1904 anywhere along this stroke length. Both sides of electromagnet 101 can be utilized in configuration 1900, which enables position detection over longer stroke lengths. Configuration 1900 is also immune to magnetic disturbances from external ferromagnetic objects and can function robustly even in the proximity of external magnetic disturbances. During testing, a ferromagnetic wrench was introduced right next to the electromagnet 101, and the performance of the position estimation in the presence of this wrench was evaluated. The position estimation was not significantly influenced by the low frequency ferromagnetic disturbance in magnetic signals introduced by the ferromagnetic wrench being brought close to the sensors 102.

A "high magnetic permeability" material according to one example means a material with a magnetic permeability substantially higher than that of steel commonly used in hydraulic actuators, aluminum commonly used in pneumatic actuators, and other metals used in common mechanical devices. The permeability of steel typically varies from 100 for carbon steel to 4000 for electrical steel, and the permeability of aluminum is close to 1. It should be noted that this is referring to relative magnetic permeability (i.e., permeability relative to that of vacuum), so the units of the permeability values are dimensionless. In one embodiment, the high magnetic permeability material 1910 has a magnetic permeability greater than about 7,000. In one specific example, material 1910 is Mu-metal (e.g., 80% Nickel and 20% Iron) with a magnetic permeability of about 10,000 to about 50,000. In another example, material 1910 is one of the following: Permalloy (with a magnetic permeability of, for example, about 8,000); Permalloy alloys (with a magnetic permeability of, for example, about 100,000); Nanoperm (with a magnetic permeability of, for example, about 80,000); or Supermalloy (with a magnetic permeability of, for example, about 50,000-150,000).

Benefits of the configuration 1900 include the fact that the system does not require any power to be provided to a moving object. Both the electromagnet 101 and the magnetic sensors 102 are located on the stationary cylinder 1902. In addition, the configuration 1900 provides external disturbance rejection, and can be adapted to longer piston movements by adding additional sensors 102.

Figure 21:
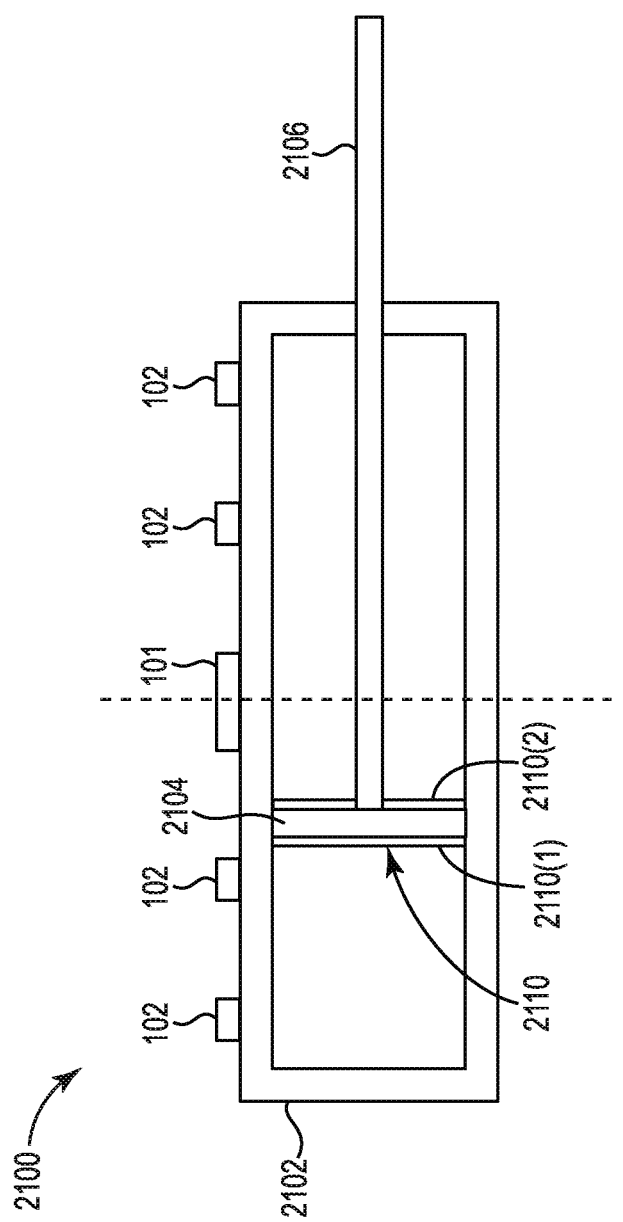
FIG. 21 is a diagram illustrating a sixth electromagnet-based position sensing configuration for the position measurement system shown in FIG. 1 according to one embodiment.

FIG. 21 is a diagram illustrating a sixth electromagnet-based position sensing configuration 2100 for the position measurement system 100 shown in FIG. 1 according to one embodiment. Sensing configuration 2100 does not require power to be supplied to the moving object. As shown in FIG. 21, the electromagnet 101 is placed on the cylinder 2102, and the magnetic sensors 102 are also placed on the cylinder 2102 a known distance away from the electromagnet 101. In one embodiment, the magnetic sensors 102 are 3-axis tunnel magnetoresistance (TMR) sensors. In the illustrated example, two magnetic sensors 102 are placed on each side of the electromagnet 101. A high magnetic permeability material 2110 is positioned on the piston 2104. In the illustrated example, the high magnetic permeability material 2110 includes a first portion 2110(1) positioned on a top side of the piston 2104 and a second portion 2110(2) positioned on a bottom side of the piston 2104. The piston rod 2106 is also attached to the bottom side of the piston 2104. The first portion 2110(1) and the second portion 2110(2) may each be formed from one or more thin films. In other examples, the high magnetic permeability material 2110 may include only a single portion 2110(1) or 2110(2) on one side of the piston 2104. In one embodiment, the first portion 2110(1) and the second portion 2110(2) have a circular shape. In another embodiment, the first portion 2110(1) and the second portion 2110(2) have an elliptical shape.

Electromagnet 101 generates an alternating magnetic field. To measure position of the piston 2104, the magnetic path between the electromagnet 101 and the magnetic sensors 102 is modified based on real-time piston position, which is facilitated by the high magnetic permeability material 2110. Due to the lowest magnetic reluctance path, the highest coupling between the electromagnet 101 and the sensors 102 occurs through the piston 2104. The high magnetic permeability material 2110 increases the magnetic coupling through the moving piston 2104 and enables its position measurement with high sensitivity. The addition of the high magnetic permeability material 2110 to the moving piston 2104 increases the influence of the moving piston 2104 on the magnetic coupling between the electromagnet 101 and the magnetic sensors 102.

In one embodiment, the piston 2104 has a stroke length of about 20 cm (i.e., about 10 cm on each side of the electromagnet 101), and the configuration 2100 may sense the position of the piston 2104 anywhere along this stroke length. In another embodiment, the piston 2104 has a stroke length of about 40 cm or larger (i.e., about 20 cm or more on each side of the electromagnet 101), and the configuration 2100 may sense the position of the piston 2104 anywhere along this stroke length. Both sides of electromagnet 101 can be utilized in configuration 2100, which enables position detection over longer stroke lengths. Configuration 2100 is also immune to magnetic disturbances from external ferromagnetic objects and can function robustly even in the proximity of external magnetic disturbances.

Benefits of the configuration 2100 include the fact that the system does not require any power to be provided to a moving object. Both the electromagnet 101 and the magnetic sensors 102 are located on the stationary cylinder 2102. In addition, the configuration 2100 provides external disturbance rejection, and can be adapted to longer piston movements by adding additional sensors 102.

Figure 22:
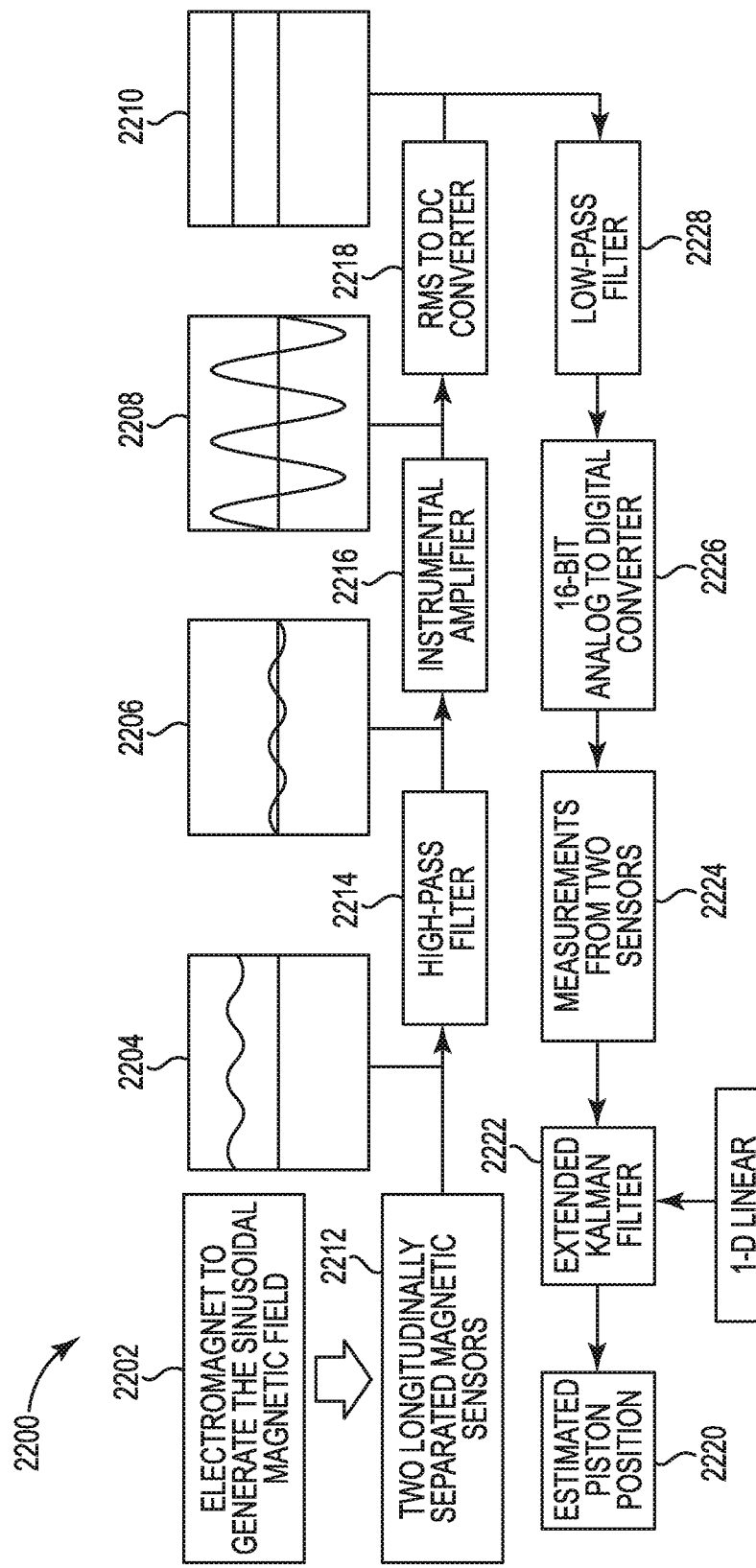
FIG. 22 is a diagram illustrating a position estimation method according to another embodiment.

FIG. 22 is a diagram illustrating a position estimation method 2200 according to another embodiment. At 2202 in method 2200, an alternating current is used to power the electromagnet 101, which generates a sinusoidal magnetic field. At 2212, the magnetic field intensity of the magnetic field is measured by two longitudinally separated magnetic sensors 102, which each produce a corresponding sensor output voltage 2204. At 2214, the sensor output voltage 2204 is filtered by a high-pass filter to remove low frequency magnetic field components and retain only a frequency of the alternating magnetic field generated by the electromagnet 101, which is represented by filtered signal 2206. At 2216, the filtered signal 2206 is amplified by an instrumental amplifier to produce amplified filtered signal 2208. At 2218, an RMS to DC converter converts the amplified filtered signal 2208 to a DC position signal 2210. At 2228, the DC position signal 2210 is filtered by a low-pass filter to produce a filtered DC position signal. At 2226, the filtered DC position signal is converted from an analog signal to a digital position signal by a 16-bit analog to digital converter. At 2224, the digital position signals corresponding to the measurements from the two magnetic sensors 102 are output from the analog to digital converter. At 2222, the digital position signals output by the analog to digital converter are filtered by an extended Kalman filter based on a 1-D linear motion model 2230 to generate an estimated piston position 2220.

One embodiment is directed to a position sensing system for measuring a position of a moving object. The system includes an electromagnet configured to generate an alternating magnetic field, and a magnetic sensor configured to measure an intensity of a first magnetic field that is based on the alternating magnetic field. The system includes a controller configured to estimate a position of the moving object based on the measured intensity of the first magnetic field. The controller may be configured to estimate the position of the moving object based further on a nonlinear model of a magnetic field produced by the moving electromagnet as a function of position around the electromagnet.

The moving object may be a piston positioned within a cylinder. The electromagnet may be positioned on the piston, and the magnetic sensor may be positioned on the cylinder. The electromagnet may be positioned on the cylinder, and the magnetic sensor may be positioned on the piston. The magnetic sensor on the piston may be powered by a battery, wherein no wires are connected to the piston. The electromagnet and the magnetic sensor may be positioned on the cylinder. The system may further include a permanent magnet positioned on the piston. The first magnetic field may be based on both the alternating magnetic field and a magnetic field produced by the permanent magnet.

The system may further include an inductive coil positioned on the piston. The electromagnet may be configured to induce an alternating current in the inductive coil during on portions of an on-off duty cycle of the electromagnet. The magnetic sensor may be configured to measure the intensity of the first magnetic field only during off portions of the on-off duty cycle of the electromagnet.

The electromagnet may be positioned on the cylinder and the magnetic sensor may be positioned on a piston rod of the piston, wherein the electromagnet and the magnetic sensor are external to the cylinder, and wherein no components of the position sensing system are located inside of the cylinder. The magnetic sensor on the piston rod may be battery-powered with a rechargeable battery, and the battery may be recharged inductively each time the piston rod is fully retracted and stationary.

A frequency of the alternating magnetic field may be much higher than a frequency of motion of the moving object and may also be much higher than a frequency of motion of any unexpected disturbances from other nearby moving magnetic or ferromagnetic objects. The controller may include a high-pass or band-pass filter that extracts only an intensity of the first magnetic field at a specific known alternating frequency of the alternating magnetic field. The moving object may have rotational motion, and relative rotational motion between the electromagnet and the magnetic sensor may be used to compute a relative rotational angle of the moving object.

Figure 16:
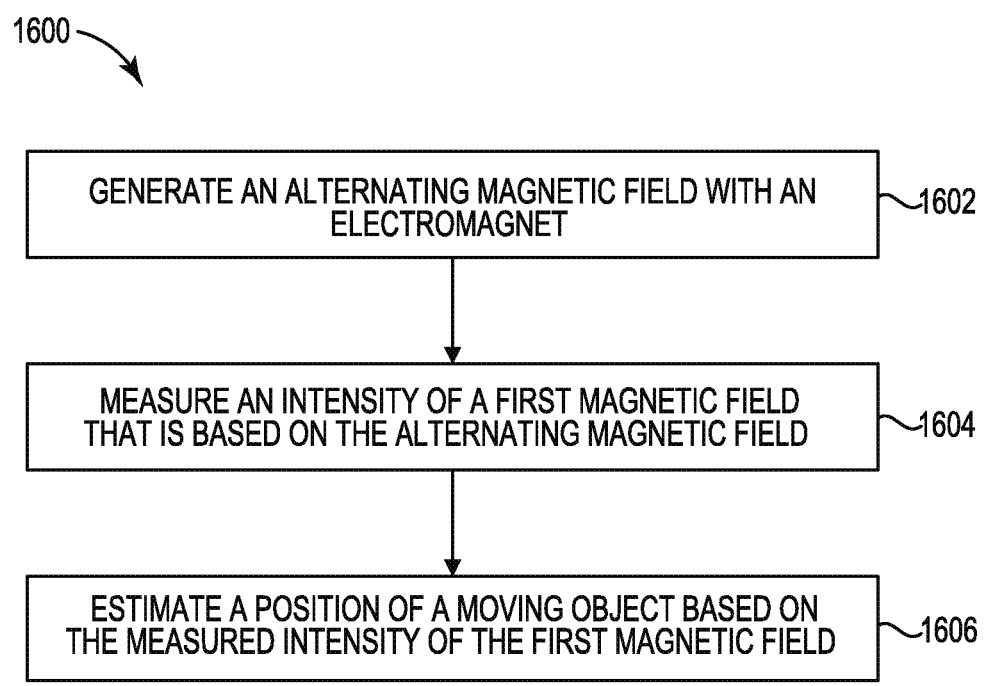
FIG. 16 is a flow diagram illustrating a method of measuring a position of a moving object according to one embodiment.

Another embodiment is directed to a method of measuring a position of a moving object. FIG. 16 is a flow diagram illustrating a method 1600 of measuring a position of a moving object according to one embodiment. In one embodiment, system 100 (FIG. 1) is configured to perform method 1600. At 1602 in method 1600, an alternating magnetic field is generated with an electromagnet. At 1604, an intensity of a first magnetic field that is based on the alternating magnetic field is measured. At 1606, a position of the moving object is estimated based on the measured intensity of the first magnetic field. The method 1600 may further include estimating the position of the moving object based further on a nonlinear model of a magnetic field produced by the electromagnet as a function of position around the electromagnet.

The moving object in the method 1600 may be a piston positioned within a cylinder. In one example of the method, a magnetic sensor may measure the intensity of the first magnetic field, the magnetic sensor may be positioned on the cylinder, and the electromagnet may be positioned on the piston. In another example of the method 1600, the magnetic sensor may be positioned on the piston, and the electromagnet may be positioned on the cylinder. In yet another example of the method 1600, the electromagnet and the magnetic sensor may be positioned on the cylinder.

Another embodiment is directed to a position sensing system for measuring a position of a linearly moving object. The system includes a high magnetic permeability material positioned on the moving object, an electromagnet configured to generate an alternating magnetic field, and at least one magnetic sensor configured to measure an intensity of a first magnetic field that is based on the alternating magnetic field. The system includes a controller configured to estimate a linear position of the moving object based on the measured intensity of the first magnetic field.

The at least one magnetic sensor may include a first magnetic sensor positioned on a first side of the electromagnet and a second magnetic sensor positioned on a second side opposite the first side of the electromagnet. The at least one magnetic sensor may include first and second magnetic sensors positioned on a first side of the electromagnet and third and fourth magnetic sensors positioned on a second side opposite the first side of the electromagnet.

The high magnetic permeability material may include a first portion positioned on a top side of the moving object, and a second portion positioned on a bottom side of the moving object. The high magnetic permeability material may be positioned on only one side of the moving object. The high magnetic permeability material may comprise at least one thin film formed on the moving object. The high magnetic permeability material may have a magnetic permeability greater than about 7,000. The high magnetic permeability material may be Mu-metal.

The controller may be configured to estimate the position of the moving object based further on a nonlinear model of a magnetic field produced by the electromagnet as a function of position of the moving object from the electromagnet. The moving object may be a piston positioned within a cylinder. The electromagnet and the at least one magnetic sensor may be positioned on the cylinder. A frequency of the alternating magnetic field may be much higher than a frequency of motion of the moving object and may also be much higher than a frequency of motion of any unexpected disturbances from other nearby moving magnetic or ferromagnetic objects. The at least one magnetic sensor may generate a magnetic sensor signal that is processed through a high pass filter to remove low frequency magnetic field components and retain only a frequency of the alternating magnetic field generated by the electromagnet.

Figure 20:
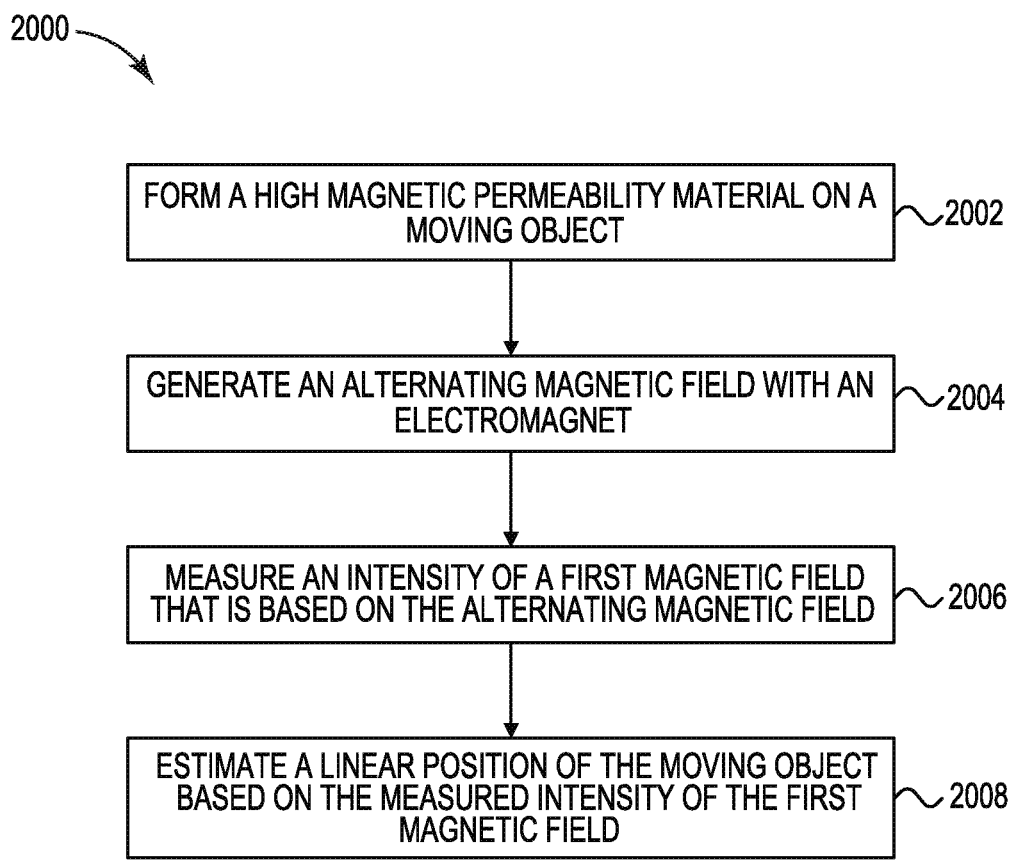
FIG. 20 is a flow diagram illustrating a method of measuring a position of a linearly moving object according to one embodiment.

Another embodiment is directed to a method of measuring a position of a linearly moving object. FIG. 20 is a flow diagram illustrating a method 2000 of measuring a position of a linearly moving object according to one embodiment. In one embodiment, system 100 (FIG. 1) is configured to perform method 2000. At 2002 in method 1600, a high magnetic permeability material is formed on the moving object. At 2004, an alternating magnetic field is generated with an electromagnet. At 2006, an intensity of a first magnetic field that is based on the alternating magnetic field is measured. At 2008, a linear position of the moving object is estimated based on the measured intensity of the first magnetic field.

The moving object in method 2000 may be a piston positioned within a cylinder. The intensity of the first magnetic field in method 2000 may be measured with at least one magnetic sensor, and the electromagnet and the at least one magnetic sensor may be positioned on the cylinder. The at least one magnetic sensor in method 2000 may include a first magnetic sensor positioned on a first side of the electromagnet and a second magnetic sensor positioned on a second side opposite the first side of the electromagnet. The at least one magnetic sensor in method 2000 may include first and second magnetic sensors positioned on a first side of the electromagnet and third and fourth magnetic sensors positioned on a second side opposite the first side of the electromagnet.

The high magnetic permeability material in method 2000 may include a first portion positioned on a top side of the piston, and a second portion positioned on a bottom side of the piston. The high magnetic permeability material may have a magnetic permeability greater than about 7,000. The high magnetic permeability material may be Mu-metal.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A position sensing system for measuring a position of a linearly moving object, comprising:
   a high magnetic permeability material positioned on the moving object;
   an electromagnet configured to generate an alternating magnetic field;
   at least one magnetic sensor configured to measure an intensity of a first magnetic field that is based on the alternating magnetic field; and
   a controller configured to estimate a linear position of the moving object based on the measured intensity of the first magnetic field, wherein the controller is configured to estimate the position of the moving object based further on a nonlinear model of a magnetic field produced by the electromagnet as a function of position around the electromagnet.

2. The position sensing system of claim 1, wherein the at least one magnetic sensor includes a first magnetic sensor positioned on a first side of the electromagnet and a second magnetic sensor positioned on a second side opposite the first side of the electromagnet.

3. The position sensing system of claim 1, wherein the at least one magnetic sensor includes first and second magnetic sensors positioned on a first side of the electromagnet and third and fourth magnetic sensors positioned on a second side opposite the first side of the electromagnet.

4. The position sensing system of claim 1, wherein the high magnetic permeability material includes a first portion positioned on a top side of the moving object, and a second portion positioned on a bottom side of the moving object.

5. The position sensing system of claim 1, wherein the high magnetic permeability material is positioned on only one side of the moving object.

6. The position sensing system of claim 1, wherein the high magnetic permeability material comprises at least one film formed on the moving object.

7. The position sensing system of claim 1, wherein the high magnetic permeability material has a magnetic permeability greater than about 7,000.

8. The position sensing system of claim 1, wherein the high magnetic permeability material is Mu-metal.

9. The position sensing system of claim 1, wherein the moving object is a piston positioned within a cylinder.

10. The position sensing system of claim 9, wherein the electromagnet and the at least one magnetic sensor are positioned on the cylinder.

11. The position sensing system of claim 1, wherein a frequency of the alternating magnetic field is much higher than a frequency of motion of the moving object and is also much higher than a frequency of motion of any unexpected disturbances from other nearby moving magnetic or ferromagnetic objects.

12. The position sensing system of claim 1, wherein the at least one magnetic sensor generates a magnetic sensor signal that is processed through a high pass filter to remove low frequency magnetic field components and retain only a frequency of the alternating magnetic field generated by the electromagnet.

13. A method of measuring a position of a linearly moving object, comprising:
    forming a high magnetic permeability material on the moving object;
    generating an alternating magnetic field with an electromagnet;
    measuring an intensity of a first magnetic field that is based on the alternating magnetic field; and
    estimating a linear position of the moving object based on the measured intensity of the first magnetic field, and based further on a nonlinear model of a magnetic field produced by the electromagnet as a function of position around the electromagnet.

14. The method of claim 13, wherein the moving object is a piston positioned within a cylinder.

15. The method of claim 14, wherein the intensity of the first magnetic field is measured with at least one magnetic sensor, and wherein the electromagnet and the at least one magnetic sensor are positioned on the cylinder.

16. The method of claim 15, wherein the at least one magnetic sensor includes a first magnetic sensor positioned on a first side of the electromagnet and a second magnetic sensor positioned on a second side opposite the first side of the electromagnet.

17. The method of claim 15, wherein the at least one magnetic sensor includes first and second magnetic sensors positioned on a first side of the electromagnet and third and fourth magnetic sensors positioned on a second side opposite the first side of the electromagnet.

18. The method of claim 14, wherein the high magnetic permeability material includes a first portion positioned on a top side of the piston, and a second portion positioned on a bottom side of the piston.

19. The method of claim 14, wherein the high magnetic permeability material is Mu-metal.

* * * * *